United States Patent
Greenwood et al.

(10) Patent No.: US 11,941,847 B2
(45) Date of Patent: Mar. 26, 2024

(54) CONTROLLER FOR A VEHICLE

(71) Applicant: JAGUAR LAND ROVER LIMITED, Coventry (GB)

(72) Inventors: Jeremy Greenwood, Warwickshire (GB); Robin Boyd, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 792 days.

(21) Appl. No.: 16/981,821

(22) PCT Filed: Feb. 4, 2019

(86) PCT No.: PCT/EP2019/052667
§ 371 (c)(1),
(2) Date: Sep. 17, 2020

(87) PCT Pub. No.: WO2019/179686
PCT Pub. Date: Sep. 26, 2019

(65) Prior Publication Data
US 2021/0042961 A1 Feb. 11, 2021

(30) Foreign Application Priority Data

Mar. 19, 2018 (GB) ...................................... 1804333
Mar. 19, 2018 (GB) ...................................... 1804334

(51) Int. Cl.
*G06T 7/60* (2017.01)
*B60R 11/04* (2006.01)
(Continued)

(52) U.S. Cl.
CPC ................ *G06T 7/80* (2017.01); *B60R 11/04* (2013.01); *G06T 7/60* (2013.01); *H04N 23/54* (2023.01);
(Continued)

(58) Field of Classification Search
CPC ... G06T 7/80; G06T 7/60; G06T 2207/30244; G06T 2207/30252; G06T 7/70; B60R 11/04; B60R 2011/004; H04N 23/54
(Continued)

(56) References Cited

U.S. PATENT DOCUMENTS 9,201,424 B1\* 12/2015 Ogale ....................... G06T 7/80
2010/0283832 A1\* 11/2010 Lin ....................... G06F 18/256
348/46
(Continued)

FOREIGN PATENT DOCUMENTS

EP 2 963 922 A1 1/2016

OTHER PUBLICATIONS

Combined Search and Examination Report, GB 1804333.1, dated Sep. 7, 2018, 7 pages.
(Continued)

*Primary Examiner* — Ali Bayat
(74) *Attorney, Agent, or Firm* — McCoy Russell LLP

(57) ABSTRACT

A controller (11) for a vehicle, the vehicle comprising an imaging device for generating image data and the imaging device further comprising an imaging accelerometer (24) for generating imaging accelerometer data for determining the orientation of the imaging device relative to the vehicle, the controller (11) comprising: an input for receiving a signal indicative of the imaging accelerometer data and the generated image data; a processor arranged to identify alignment artefacts in the received image data in dependence on the received imaging device imaging accelerometer data; and an output for outputting an error signal in dependence on the identified alignment artefacts.

16 Claims, 18 Drawing Sheets

(51) Int. Cl.
*G06T 7/80* (2017.01)
*H04N 23/54* (2023.01)
*B60R 11/00* (2006.01)

(52) U.S. Cl.
CPC ............... *B60R 2011/004* (2013.01); *G06T 2207/30244* (2013.01); *G06T 2207/30252* (2013.01)

(58) Field of Classification Search
USPC ........................................................ 382/103
See application file for complete search history.

(56) References Cited

U.S. PATENT DOCUMENTS

| | | |
|---|---|---|
| 2011/0149094 A1 | 6/2011 | Chen et al. |
| 2011/0228112 A1 | 9/2011 | Kaheel et al. |
| 2013/0236858 A1 | 9/2013 | Lin et al. |
| 2015/0002688 A1 | 1/2015 | Baldwin et al. |
| 2015/0127239 A1* | 5/2015 | Breed ............... G01S 19/13 701/70 |
| 2015/0341536 A1 | 11/2015 | Huang et al. |
| 2017/0072850 A1 | 3/2017 | Curtis et al. |
| 2017/0154224 A1 | 6/2017 | Torii |
| 2019/0206084 A1* | 7/2019 | Noble ................ G06T 7/80 |
| 2020/0134853 A1* | 4/2020 | Milici ................ G06T 7/80 |
| 2020/0174107 A1* | 6/2020 | Briggs ............... H04N 23/90 |

OTHER PUBLICATIONS

International Search Report and Written Opinion, PCT/EP2019/052667, dated May 14, 2019, 15 pages.

* cited by examiner

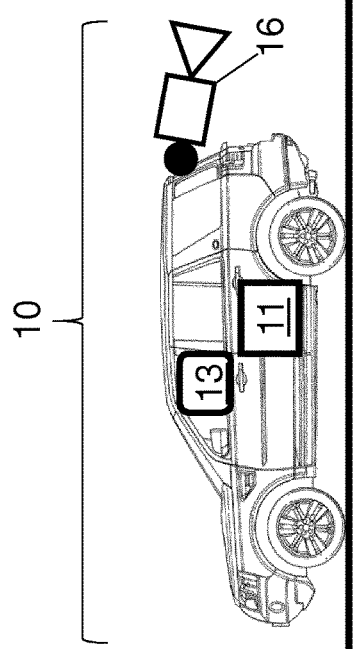
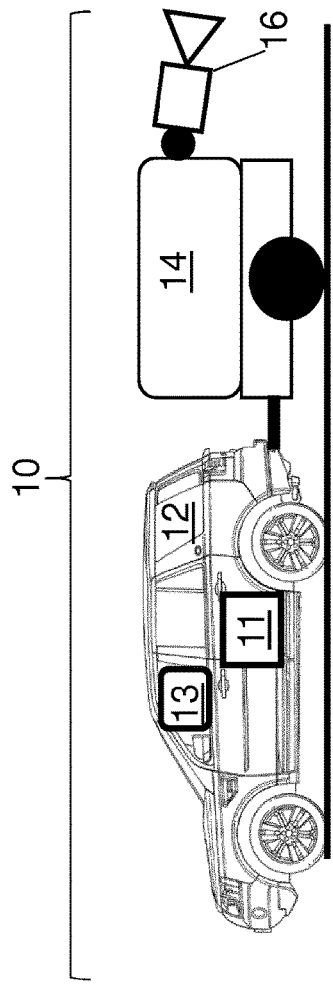
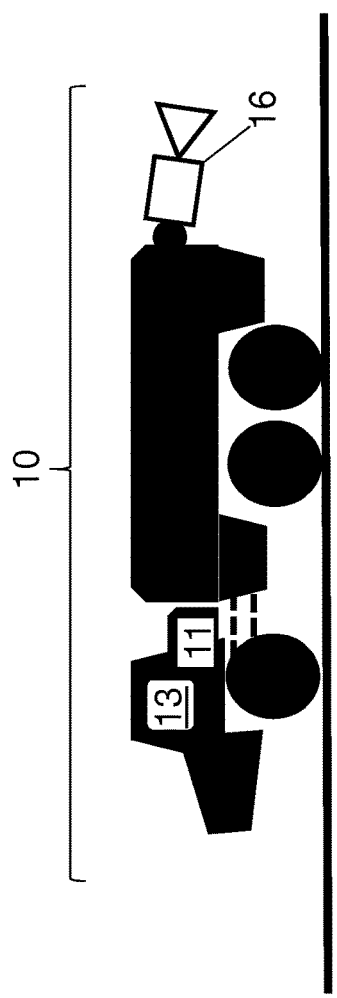

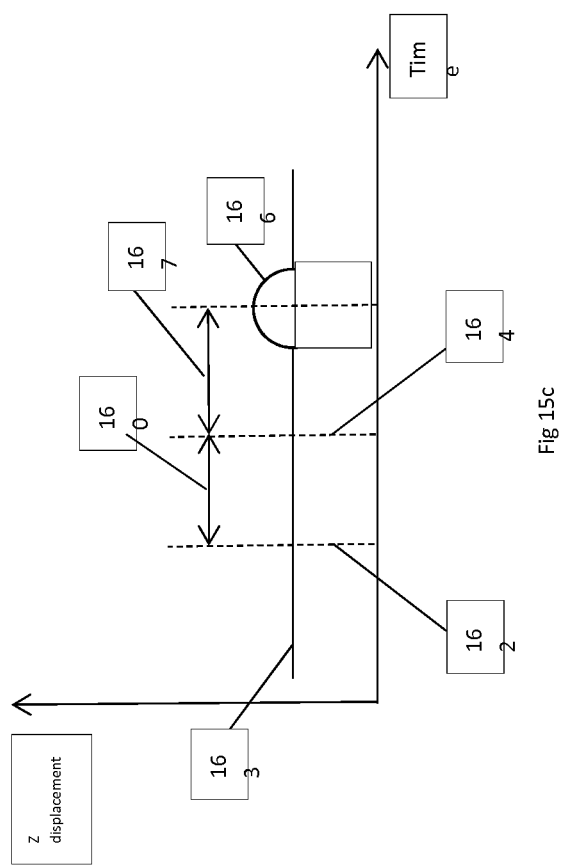

CONTROLLER FOR A VEHICLE

CROSS-REFERENCE TO RELATED APPLICATIONS

This application is a 371 of International Application No. PCT/EP2019/052667, filed Feb. 4, 2019, which claims priority to GB Patent Application 1804334.9, filed Mar. 19, 2018, and GB Patent Application 1804333.1, filed Mar. 19, 2018, the contents of which are incorporated by reference herein in their entirety.

TECHNICAL FIELD

The present disclosure relates to a controller for a vehicle and particularly, but not exclusively, to a controller for a vehicle comprising an imaging device. Aspects of the invention relate to a controller, to a vehicle, to a trailer, to an articulated vehicle and to a method.

BACKGROUND

Reversing and manoeuvring a vehicle fitted with a trailer can be challenging as large trailers may limit a driver's visibility. In order to overcome this problem it is known to fit cameras to vehicles and trailers in order to improve drivers' visibility and spatial awareness. The camera image will often be combined with other images or guidelines for a more complete or informative view, as a result, it is important to know the alignment of the camera with respect to the vehicle and/or trailer.

The problem with fitting cameras to vehicles or trailers is that the cameras need to be optically aligned which is often not achievable when the camera is to be fitted by the user. Often users will have multiple vehicles or trailers and may wish to use the same camera on each vehicle or trailer. This poses the problem that the user of the vehicle must fit the camera very accurately each time the user fits the camera. It is not reasonable to expect the user of the vehicle to achieve the required level of precision when fitting a camera and as a result cameras fitted by users/drivers are often fitted incorrectly. An incorrectly fitted camera can lead to variation in the guidance the displayed image provides a user/driver during a manoeuvre.

The present invention has been devised to mitigate or overcome at least some of the above-mentioned problems.

SUMMARY OF THE INVENTION

Aspects and embodiments of the current invention provide a controller, a vehicle, a trailer, an articulated vehicle and a method as claimed in the appended claims.

According to an aspect of the present invention there is provided a controller for a vehicle, the vehicle comprising an imaging device for generating image data and the imaging device further comprising an imaging accelerometer for generating imaging accelerometer data, the controller comprising: an input for receiving a signal indicative of the imaging accelerometer data and the image data; a processor arranged to identify alignment artefacts in the received image data in dependence on the received imaging accelerometer data; and an output for outputting an error signal in dependence on the identified alignment artefacts.

According to a further aspect of the invention there is provided a controller for a vehicle, the vehicle comprising an imaging device for generating image data and the imaging device further comprising an imaging accelerometer for generating imaging accelerometer data for determining the orientation of the imaging device relative to the vehicle, the controller comprising: an input for receiving a signal indicative of the imaging accelerometer data and the generated image data; a processor arranged to identify alignment artefacts in the received image data in dependence on the received imaging accelerometer data; and an output for outputting an error signal in dependence on the identified alignment artefacts.

The controller provides the advantage of quantifying and correcting alignment errors in image data generated by imaging devices, such as removable reversing camera devices, RADAR devices and LIDAR devices that have been mounted out of alignment. The controller identifies the alignment artefacts and corrects for this prior to outputting image data to a display device of the vehicle. This ensures that image data output to the vehicle display device is correctly orientated and represents the area that a driver is reversing or manoeuvring into accurately.

The embodiments described herein relate to an imaging device such as, a removable reversing camera, however the imaging device could equally be a RADAR or LIDAR device, and the controller may be configured to control the operation of said RADAR or LIDAR device.

According to an embodiment, the controller may be arranged to determine the orientation of the imaging device relative to the vehicle based on the imaging accelerometer data. In an embodiment, the vehicle may be an articulated vehicle comprising a tow vehicle and a trailer.

In another embodiment, the imaging device may be mounted to the trailer.

To this end, the controller determines the orientation of the imaging device based on imaging accelerometer data generated by the imaging accelerometer. The imaging device may comprise the imaging accelerometer or the accelerometer may be external to the imaging device. Furthermore, determining the orientation of the imaging device relative to the trailer prevents errors in calculating the orientation of the imaging device arising when the vehicle is not travelling on a flat surface or is travelling around a corner.

In one embodiment, the controller may be arranged to receive vehicle accelerometer data generated by a vehicle accelerometer positioned on the tow vehicle. In such embodiments, the controller may be arranged to determine the orientation of the articulated vehicle based on the vehicle accelerometer data from the vehicle accelerometer. This provides the advantage of enabling the controller to determine the angle of terrain that the vehicle is travelling upon.

In another embodiment, the controller may be arranged to determine the orientation of the tow vehicle relative to a reference orientation based on the vehicle accelerometer data from the vehicle accelerometer. The reference orientation may be, for example, the horizontal or vertical.

In an embodiment, a correction factor to be applied to image data generated by the imaging device may be calculated in dependence on the orientation of the tow vehicle relative to the reference orientation.

The controller may be configured to determine the orientation of the imaging device based on a gravitational vector generated by the imaging accelerometer when the vehicle is travelling at a constant velocity. In another embodiment, the constant velocity may be zero meaning the vehicle is not moving.

In such embodiments, the controller may calculate the orientation of the vehicle upon, for example, an initial start-up of the vehicle prior to moving or when the vehicle is stationary during a journey in order to determine the orientation of the imaging device before a journey commences. Furthermore, the controller may monitor the orientation of the imaging device throughout the journey and recalibrate the orientation of the imaging device accordingly in scenarios where the imaging device orientation changes during a journey.

According to an embodiment of the invention the imaging device is removable from the vehicle. This enables the user to use the same imaging device on a variety of vehicles, including articulated vehicles and trailers and also enables the user to remove the imaging device from the vehicle once it has been parked so as to improve security and avoid the risk of theft of the imaging device from the vehicle. In an embodiment the imaging device may be a reversing camera.

In some embodiments, the imaging accelerometer may be a 6 degrees of freedom accelerometer.

In another embodiment, the imaging device may be mounted facing rearwardly on the rear of the vehicle. In this embodiment the imaging device may be used as a reversing camera mounted on the rear of the vehicle thereby providing a user of the vehicle with image data indicative of the region located behind the vehicle.

In one embodiment, the imaging device may be mounted rearwardly facing on the rear of a trailer. In this embodiment the imaging device may be used to generate image data of a region located to the rear of the trailer thereby providing a user of the vehicle with image data indicative of the region located behind the trailer.

In an embodiment, the imaging device may be mounted rearwardly facing on an articulated vehicle comprising a tow vehicle and a trailer. In this embodiment the imaging device may be located on at least one of or both of the tow vehicle and trailer. The imaging device may be mounted on the tow vehicle and form part of a towing assistant or towing aid feature or hitching assistant system. Alternatively, the imaging device may be mounted on the trailer and form part of a reversing imaging system.

According to an aspect of the present invention there is provided a vehicle comprising the controller as described in the preceding paragraphs. According to another aspect of the present invention there is provided a trailer comprising the controller as described in the preceding paragraphs. According to one aspect of the present invention there is provided an articulated vehicle comprising the controller as described in the preceding paragraphs. According to another aspect of the present invention there is provided a vehicle comprising the controller and at least one imaging device as described in the preceding paragraphs.

According to an aspect of the invention there is provided a method of correcting alignment errors in image data from an imaging device for a vehicle, wherein the imaging device generates image data and comprises an imaging accelerometer for generating imaging accelerometer data, the method comprising: receiving imaging accelerometer data and image data, identifying alignment artefacts in received image data in dependence on the received imaging accelerometer data and outputting an error signal in dependence on the identified alignment artefacts.

The method enables the correction of alignment artefacts in image data generated by an imaging device that may have been fitted incorrectly or out of alignment. The method provides the advantage of enabling the output of image data to, for example, a visual display device that is correctly aligned when the imaging device is fitted out of alignment.

The method may comprise determining the orientation of the imaging device relative to the vehicle based on the imaging accelerometer data. In such embodiments, the vehicle may be an articulated vehicle comprising a tow vehicle and a trailer. The method may comprise determining the orientation of the imaging device relative to the trailer.

According to another embodiment, the method may comprise receiving vehicle accelerometer data generated by a vehicle accelerometer positioned on the tow vehicle.

In such embodiments, the method may comprise determining the orientation of the tow vehicle relative to a reference orientation based on the vehicle accelerometer data from the vehicle accelerometer.

The method may comprise calculating a correction factor to be applied to image data generated by the imaging device in dependence on the orientation of the tow vehicle relative to the reference orientation.

The method may comprise determining the orientation of the imaging device relative to the vehicle based on a signal indicative of a gravitational acceleration vector calculated by the imaging accelerometer when the vehicle is travelling at a constant velocity. In an embodiment of the invention the constant velocity is equal to zero.

According to an aspect of the present invention there is provided a control module for a vehicle, wherein the vehicle comprises a tow vehicle and a trailer, the control module comprising: a first input configured to receive a first input signal indicative of trailer accelerometer data being generated by a trailer accelerometer associated with the trailer; a second input configured to receive a second input signal indicative of tow vehicle accelerometer data being generated by a tow vehicle accelerometer associated with the tow vehicle; a processor arranged to determine the length of the trailer in dependence on the trailer accelerometer data and the tow vehicle accelerometer data; and an output configured to output a signal indicative of the length of the trailer as determined by the processor.

Advantageously, the control module enables the length of the trailer being towed by a tow vehicle to be calculated. This mitigates against a user of the vehicle from having to measure the length of the trailer being towed and manually inputting the length of the trailer into a human machine interface within the vehicle. The length of the trailer, as calculated by the control module, is approximately equal to the length from a hitch point, between the trailer and the tow vehicle, and the trailer accelerometer which is typically mounted on a rear surface of the trailer. The length of the trailer as calculated by the control module may be used by the vehicle to calibrate systems that require an indication of the length of the trailer for their function. In an embodiment the length of the trailer as calculated by the control module is approximately equal to double the distance between a rear axle of the tow vehicle and an axle of the trailer. The skilled person would appreciate that in embodiments where the trailer axle is not in the centre of the trailer that the length of the trailer would be approximately equal to a length other than double the distance from the rear axle of the tow vehicle to the axle of the trailer.

Furthermore, comparing accelerometer data from the tow vehicle accelerometer and accelerometer data from the trailer accelerometer provides the advantage of enabling the control module to monitor the displacement of the trailer relative to the tow vehicle which in turn may enable the control module to determine the length of the trailer.

In an embodiment, the trailer accelerometer data may be indicative of a trailer displacement relative to the tow vehicle. In another embodiment, the trailer displacement may be at least one of a lateral displacement or a vertical displacement of the trailer relative to the tow vehicle.

This is advantageous as the length of the trailer may be calculated by the control module when the trailer displaces relative to the tow vehicle, for example when the tow vehicle is travelling around a corner or when the position of the tow vehicle changes in a vertical displacement, for example when the tow vehicle travels over a speed bump or goes up/down a hill.

In another embodiment, the trailer accelerometer data and the vehicle accelerometer data vary with time, and the processor may be configured to determine the length of the trailer in dependence on a phase difference between the trailer accelerometer data and the vehicle accelerometer data. This is advantageous as it enables the control module to calculate the length of the trailer when the vehicle travels over a feature on the road surface that causes the vehicle to displace vertically, for example when travelling over a speed bump.

In an embodiment, the control module comprises a further input configured to receive a further input signal indicative of at least one of: the speed of the vehicle; the hitch angle of the trailer relative to the tow vehicle; or the turning radius of the vehicle; and wherein the processor is configured to determine the length of the trailer in dependence on at least the first input signal and the further input signal.

In another embodiment, the control module may be configured to calculate an outswing of the trailer relative to the path of the tow vehicle in dependence on the received trailer acceleration data. This is advantageous as the control module may calculate the length of the trailer as the tow vehicle travels around a corner by taking advantage of the fact that the trailer swings outward when the tow vehicle corners.

In an alternative embodiment, the output may be configured to provide the output signal to a vehicle system. In an embodiment the vehicle system may be one or more of an HMI; an ADAS feature; a towing system; a parking system; a blind spot system; or a lane guidance system. The vehicle system may be any system on the tow vehicle that requires the length of the trailer being towed by the tow vehicle to function and/or be calibrated accurately. The aforementioned list of vehicle systems is by way of example and a person skilled in the art would appreciate that the length of the trailer may be output to vehicle systems not listed above.

In one embodiment the control module may be configured to store the length of the trailer, in association with a trailer identifier, in a memory module.

This is advantageous in situations where the control module has previously calculated the length of the trailer being towed by the tow vehicle. In these scenarios the control module may identify the trailer being towed by the tow vehicle, and thus the length of said trailer, based on the trailer identifier and length being stored in the memory module.

In another embodiment, the trailer accelerometer may be positionable on a rear surface of the trailer. In one embodiment, the trailer accelerometer forms part of an imaging device positionable on the trailer.

According to an aspect of the present invention there is provided a vehicle comprising the control module as referred to in any of the preceding paragraphs and at least one imaging device which is positioned on the trailer of the vehicle.

According to another aspect of the present invention there is provided a vehicle comprising the control module as described in any of the preceding paragraphs.

According to a further aspect of the present invention there is provided a trailer comprising the control module according to any of the preceding paragraphs.

According to another aspect of the present invention there is provided an articulated vehicle comprising the control module according to any of the preceding paragraphs.

According to another aspect of the present invention there is provided a method of determining the length of a trailer being towed by a tow vehicle, wherein the trailer comprises a trailer accelerometer configured to generate trailer acceleration data and the tow vehicle comprises a tow vehicle accelerometer configured to generate tow vehicle accelerometer data, the method comprising: receiving trailer accelerometer data generated by the trailer accelerometer; receiving tow vehicle accelerometer data generated by the tow vehicle accelerometer; determining the length of the trailer in dependence on the received trailer accelerometer data and the received tow vehicle accelerometer data; and outputting the length of the trailer.

In an embodiment, receiving trailer accelerometer data may comprise receiving trailer accelerometer data from a trailer accelerometer forming part of an imaging device. This is advantageous as it is becoming common practice to use removable imaging devices mounted to trailers. These imaging devices typically take the form of electronic video cameras, but may alternatively take the form of RADAR systems or LIDAR systems, any of which may further comprise accelerometers, and may be mounted on the rear surface of the trailer to assist the driver when driving, the method may take advantage of this and utilise accelerometer data from a trailer accelerometer mounted within an imaging device.

In another embodiment, receiving trailer accelerometer data may comprise receiving data indicative of a trailer displacement relative to the tow vehicle.

In an embodiment, the method may comprise receiving a signal indicative of at least one of: the speed of the vehicle; the hitch angle of the trailer relative to the tow vehicle; or the turning radius of the vehicle. In another embodiment the method may comprise determining the outswing of the trailer relative to the tow vehicle in dependence on receiving the trailer accelerometer data.

In another embodiment, the method may comprise storing the length of the trailer, in association with a trailer identifier, in a memory module.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 9a, 9b and 9c show three examples of vehicles according to aspects of the invention.

FIGS. 15a, 15b and 15c illustrate graphs showing the z-displacement of the tow vehicle and trailer, respectively, travelling over the feature of FIGS. 14a, 14b and 14c over a period of time.

DETAILED DESCRIPTION

Figure 1:
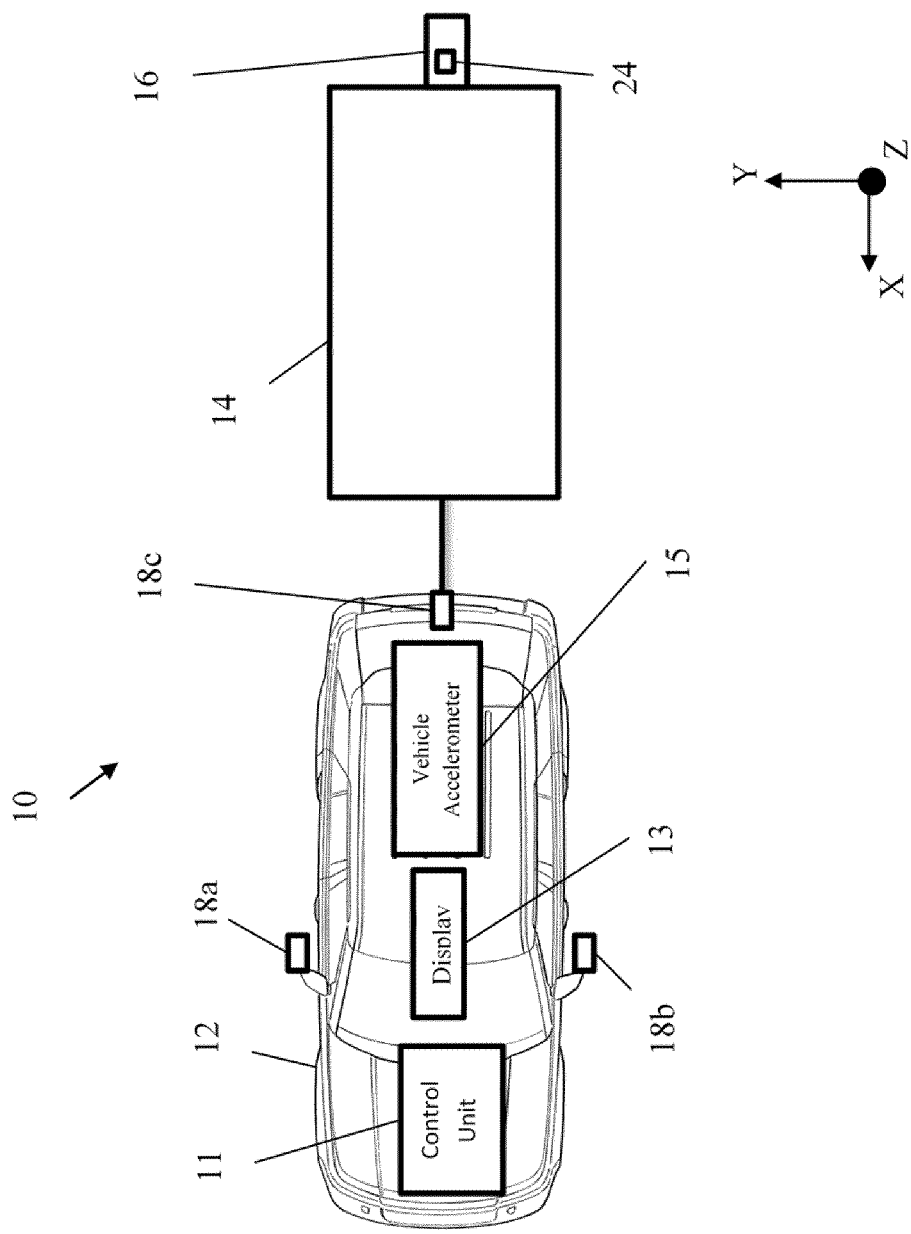
FIG. 1 shows an articulated vehicle comprising a tow vehicle and a trailer suitable for use with embodiments of the invention.

In general terms, embodiments of the invention provide a means of determining and correcting alignment artefacts within image data generated by an imaging device mounted to a vehicle 10. The vehicle may be an articulated vehicle 10 and comprise a tow vehicle 12 and a trailer 14, and the imaging device 16 may be mounted to the trailer 14. The imaging device 16 may be mounted to the rear of the trailer 14 (as shown in FIG. 1). Additionally or alternatively, the imaging device 14 may be mounted to the tow vehicle 12 (not shown). The tow vehicle 12 may be a car, SUV, MPV, truck or tractor. Other tow vehicles are useful. The imaging device 16 may be mounted to the front or the rear of the tow vehicle 12. Alternatively, the vehicle 10 may take the form of unitary, rigid vehicle comprising a rigid, non-articulating vehicle body, and the imaging device 16 may be mounted to that vehicle body. Such a vehicle, whilst not shown in the Figures, will be readily understood to take the form of a van or truck, or other such vehicle having rigid bodies.

A control unit 11, configured to receive an input from an accelerometer 24 associated with the imaging device 16, herein referred to as an "imaging accelerometer", determines the difference in alignment between the imaging device 16 and the vehicle 10, based on accelerometer data from the imaging accelerometer 24. The controller 11 may then determine the alignment error of the imaging device 16 based on the received imaging accelerometer data.

The control unit 11 is further configured to output an error signal to a display device 13 within the vehicle 10 or tow vehicle 12. The output error signal may be image data that has been corrected by the control unit 11 to reduce any alignment artefacts within the image data and to align it with other images or guidelines.

Alignment artefacts may be considered to be errors in the alignment of the imaging device 16 relative to a known reference orientation. The reference orientation may be, for example, a horizontal or a vertical orientation. Alternatively, the reference orientation may be relative to the tow vehicle 12 or trailer 14. Alignment artefacts in image data generated by the imaging device 16 cause the generated image data to be different to the image data that the control unit 11 expects the imaging device 16 to capture. This may occur when an imaging device 16, such as a removable reversing camera, is mounted on a vehicle 10, such as a trailer 14 forming part of articulated vehicle 10, out of alignment or is accidentally moved.

A specific embodiment of the invention will now be described, by way of example only, with numerous specific features discussed, to provide a thorough understanding of how the inventive concept as defined in the claims may be implemented in practice. However, it will be apparent to the skilled person that the invention may be put into effect in other ways and that in some instances well known methods, techniques and structures have been summarised to avoid obscuring the invention unnecessarily.

To place the embodiments of the invention in a suitable context, FIG. 1 illustrates schematically a tow vehicle 12 and trailer 14 arrangement, known, and referred to herein, as an "articulated vehicle" 10, suitable for use with embodiments of the invention. In this example, the tow vehicle 12 comprises a plurality of imaging devices or reversing cameras 18a, 18b, 18c, a control unit 11, a display device 13 and a vehicle accelerometer 15. The reversing cameras 18a, 18b, 18c may be mounted to each of the door mirrors of the tow vehicle 12 and to the rear of the tow vehicle 12 to give an all-round view of objects within the vicinity of the tow vehicle 12 to a driver. The control unit 11 is configured to receive image data generated by the reversing cameras 18a, 18b, 18c and to output the image data to the display device 13.

The trailer 14, attached by means of an articulated hitch to the tow vehicle 12, is fitted with an imaging device or removable reversing camera 16 mounted to the rear of the trailer 14 and configured to generate and transmit image data to the control unit 11. The imaging device or removable reversing camera 16 comprises an imaging accelerometer 24 configured to generate imaging accelerometer data indicative of the orientation and alignment of the removable reversing camera 16. The removable reversing camera 16 is configured to transmit the imaging accelerometer data and the generated image data to the control unit 11. The imaging accelerometer 24 may be an independent device located on an internal or external surface of the removable reversing camera 16.

The vehicle accelerometer 15 is configured to generate vehicle accelerometer data. The vehicle accelerometer data is data indicative of the orientation of the tow vehicle relative to a reference orientation such as to a vertical or horizontal orientation.

The control unit 11 is configured to receive image data inputs from the imaging devices or reversing cameras 16, 18a, 18b, 18c on the vehicle 10, imaging accelerometer data from the imaging accelerometer 24 and vehicle accelerometer data from the vehicle accelerometer 15. The control unit 11 corrects the image data generated by the removable reversing camera 16 for any misalignment of the reversing camera 16, based on the imaging accelerometer data and the vehicle accelerometer data from both the imaging accelerometer 24 and the vehicle accelerometer 15 respectively. The control unit 11 outputs a display signal to the display device 13 within the tow vehicle 12 to display image data of objects within the vicinity of the vehicle 10 to the driver on the display device 13.

The control unit 11 may combine image data from all the imaging devices or reversing cameras 18a, 18b, 18c on the vehicle 10, including the removable reversing camera 16, and output a single image to the driver via the display device 13. The image output to the driver may be a mosaic or component of one or more of the reversing camera images, thus providing a larger field of view to the driver than is achievable from a single imaging device.

FIG. 1 also shows a set of Cartesian axes local to the vehicle 10 and comprising a longitudinal forward axis x, a lateral axis y and a vertical axis z. The axes are arranged so that forward vehicle travel in a forward gear is generally in the +x direction, and generally perpendicular to the y-axis. The −z direction is downwards towards the ground over which the vehicle 10 is travelling.

Figure 2:
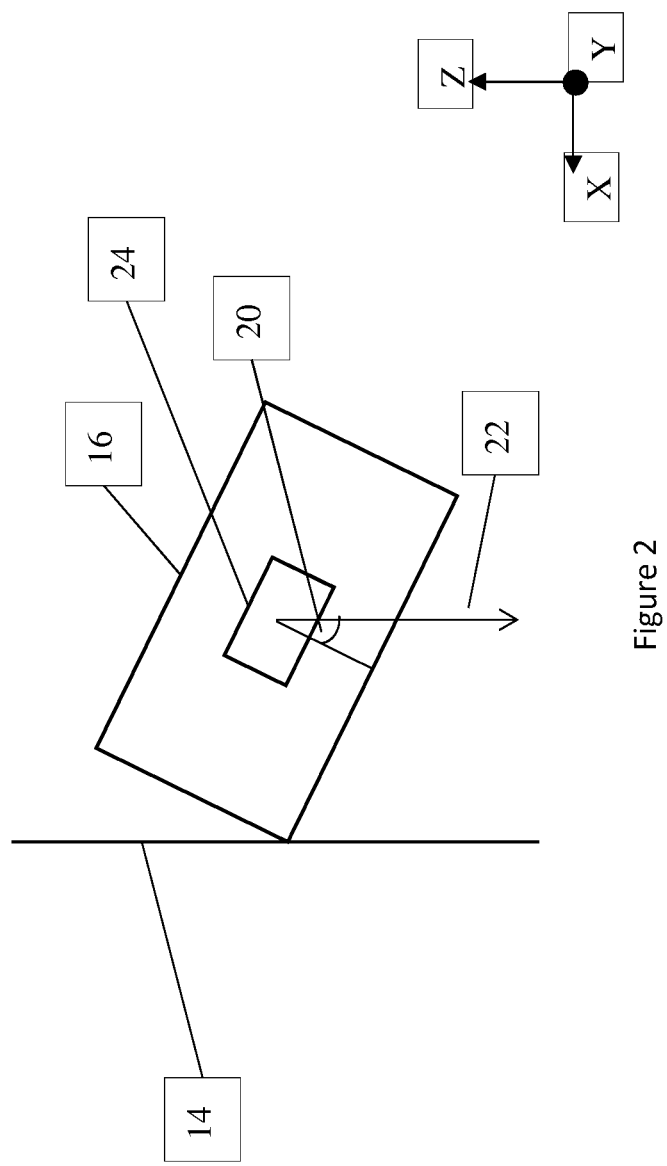
FIG. 2 shows schematically an imaging device mounted, with a declination component, to the rear of the trailer of FIG. 1.

FIG. 2 illustrates the removable reversing camera 16 fitted out of alignment with a horizontal reference orientation. The imaging device 16 has been pivoted about the y-axis such that a declination angle 20, which may be calculated by the imaging accelerometer 24, is shown in FIG. 2. As a result of the declination angle 20, the removable reversing camera 16 of FIG. 2 is orientated in such a manner that a gravitational acceleration vector 22 does not act orthogonally to the removable reversing camera 16. The declination angle 20 of the removable reversing camera 16 is shown in FIG. 2 and may be calculated by the control unit 11 based on input imaging accelerometer data.

Figure 3:
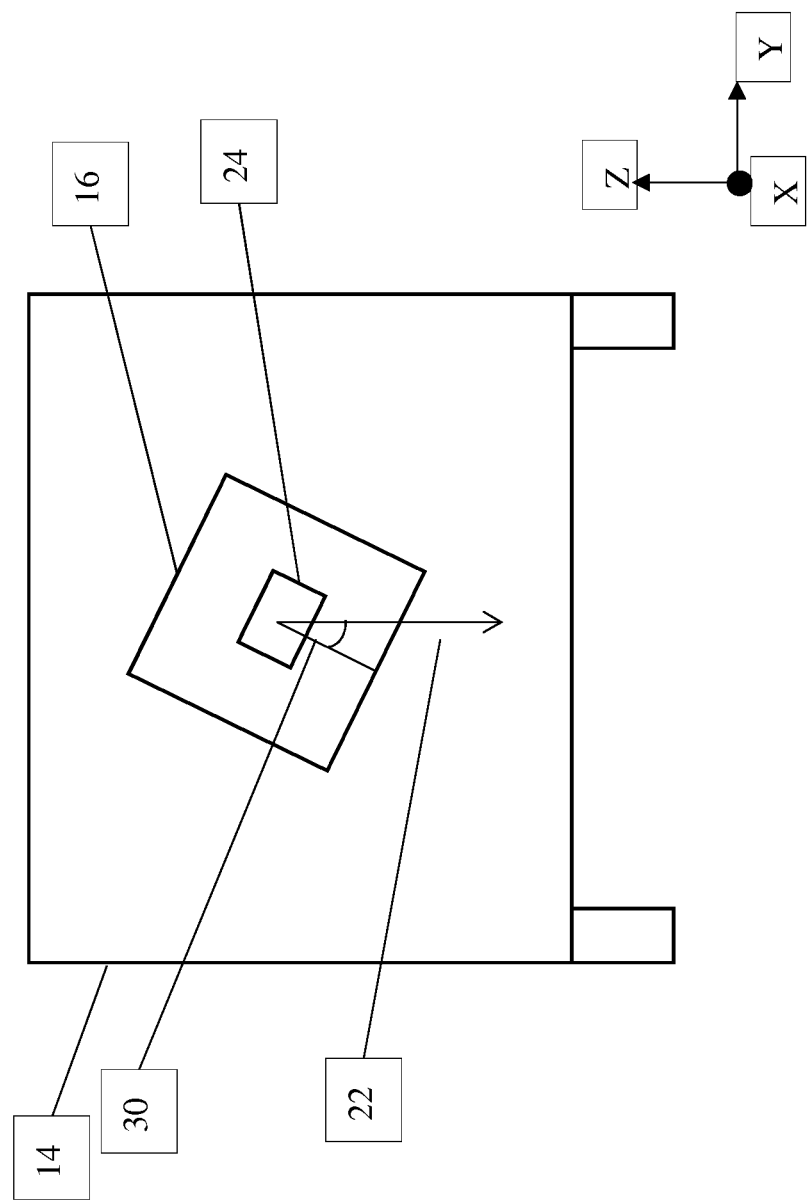
FIG. 3 shows schematically an imaging device mounted, with a tilt component, to the rear of the trailer of FIG. 1.

Similarly, FIG. 3 illustrates the removable reversing camera 16 fitted out of optical alignment such that there is a tilt component. Tilt may be considered as an element of rotation about the x-axis. FIG. 3 illustrates the tilt angle 30 of the removable reversing camera 16 schematically in relation to the vertical gravitational vector 22 as measured by the imaging accelerometer 24. The control unit 11 may calculate the magnitude of the tilt angle 30 based on received imaging accelerometer data.

Figure 4:
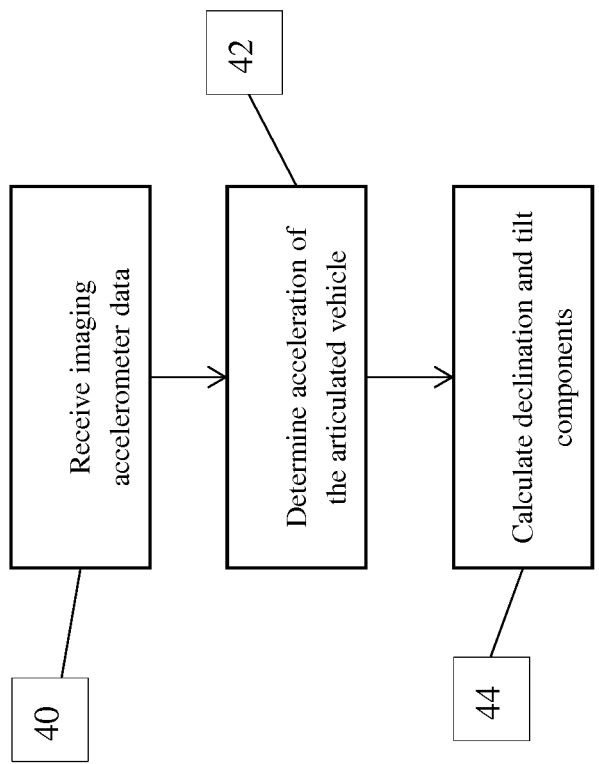
FIG. 4 is a flow chart of steps followed by the control unit of FIG. 1 to determine components of declination and tilt.

The magnitudes of the declination 20 and tilt 30 components on the removable reversing camera 16 are determined by the control unit 11 based on the received imaging accelerometer data and vehicle accelerometer data. FIG. 4 illustrates the steps followed by the control unit 11 when determining the declination 20 and tilt 30 angles of the removable camera 16.

The first step 40 involves transmitting accelerometer data from both the imaging accelerometer 24 and the vehicle accelerometer 15 to the control unit 11. The control unit 11 may receive data indicative of the velocity of the vehicle 10 from a vehicle speed sensor and calculate the acceleration based on the input velocity data, for example, if the tow vehicle 12 does not have a vehicle accelerometer 15.

In the second step 42 the control unit 11 analyses the data indicative of the velocity and acceleration of the vehicle 10 to determine when the velocity of the vehicle 10 is constant, meaning the acceleration is equal to zero. This could be when the vehicle is stationary prior to initiating a drive cycle.

When the acceleration of the tow vehicle 12 is deemed to be constant, the control unit 11 initiates the third step 44 involving the determining of the declination 20 and tilt 30 angles of the removable reversing camera 16. The control unit 11 compares the imaging accelerometer data from the imaging accelerometer 24 with the vehicle accelerometer data to calculate the declination 20 and tilt 30 of the removable reversing camera 16. The difference in the orientation of the imaging device 16, as given by the imaging accelerometer data, and the orientation of the tow vehicle 12, as given by the vehicle accelerometer 15 may be used to determine the declination 20 and tilt 30 of the imaging device 16.

In an embodiment of the invention, the control unit 11 may initiate the third step 44 and calculate the tilt 30 and declination 20 angles of the removable reversing camera 16 when the acceleration of the vehicle is not equal to zero by comparing imaging accelerometer data from the imaging accelerometer 24 with vehicle accelerometer data from the vehicle accelerometer 15. A component of the vehicle accelerometer data from the vehicle accelerometer 15 indicative of the vehicle acceleration acts as a correction factor to the accelerometer data from the imaging accelerometer 24.

When the driver of the vehicle 10 initiates a driving phase, by powering up the tow vehicle 12, the tow vehicle 12 is initially stationary (acceleration is equal to zero), meaning the control unit 11 can calculate the declination 20 and tilt 30 of the removable reversing camera 16 instantly. The control unit 11 continues to monitor the declination 20 and tilt 30 values of the removable reversing camera 16 throughout the duration of a journey to update the declination 20 and tilt 30 values in case the removable reversing camera 16 moves during the journey.

Figure 5:
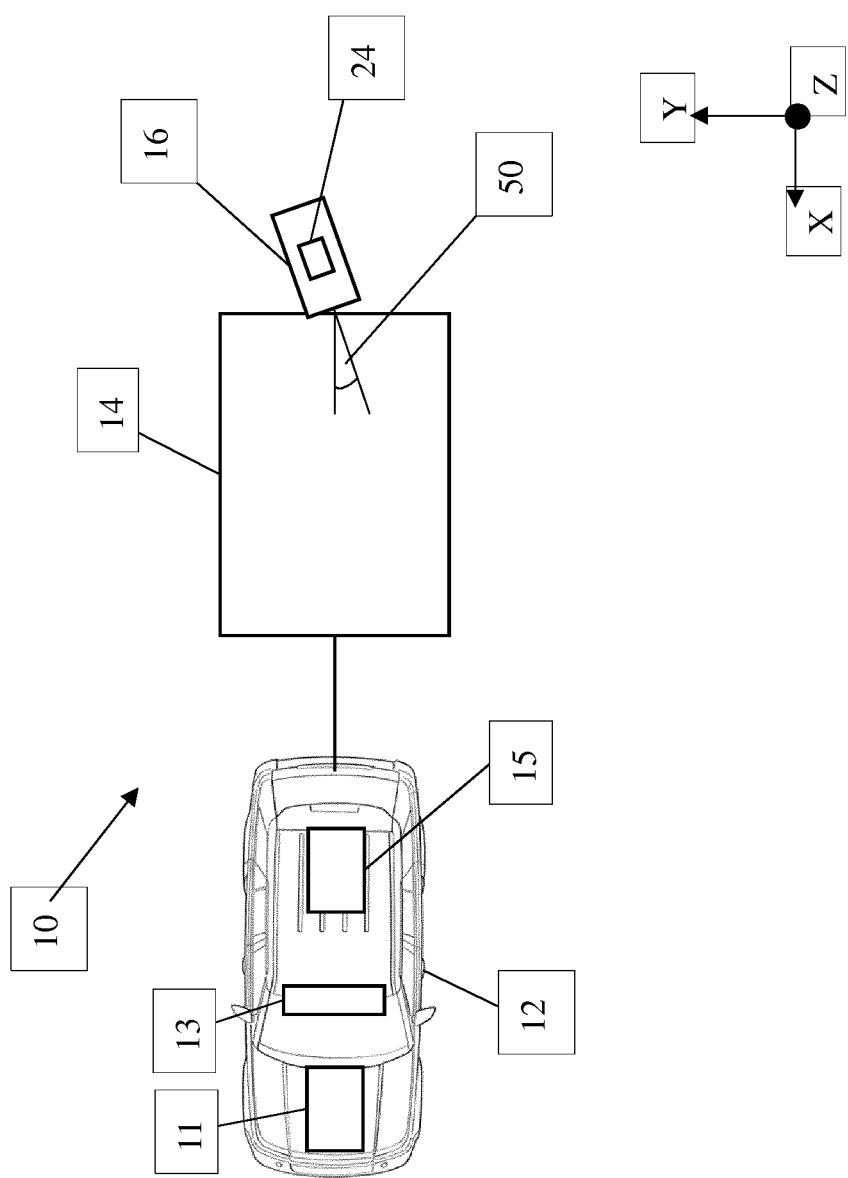
FIG. 5 shows schematically an imaging device mounted, with a yaw component, to the rear of the trailer of FIG. 1.

FIG. 5 illustrates the vehicle 10 schematically wherein the removable reversing camera 16 is mounted to the trailer 14 with a yaw angle error 50. Yaw angle 50 may be considered to be rotation about the vertical z-axis. The magnitude of the yaw angle 50 may be calculated by comparing the difference in the acceleration vectors output from both the vehicle accelerometer 15 and the imaging accelerometer 24 when the vehicle 10 is accelerating in a straight line.

Figure 6:
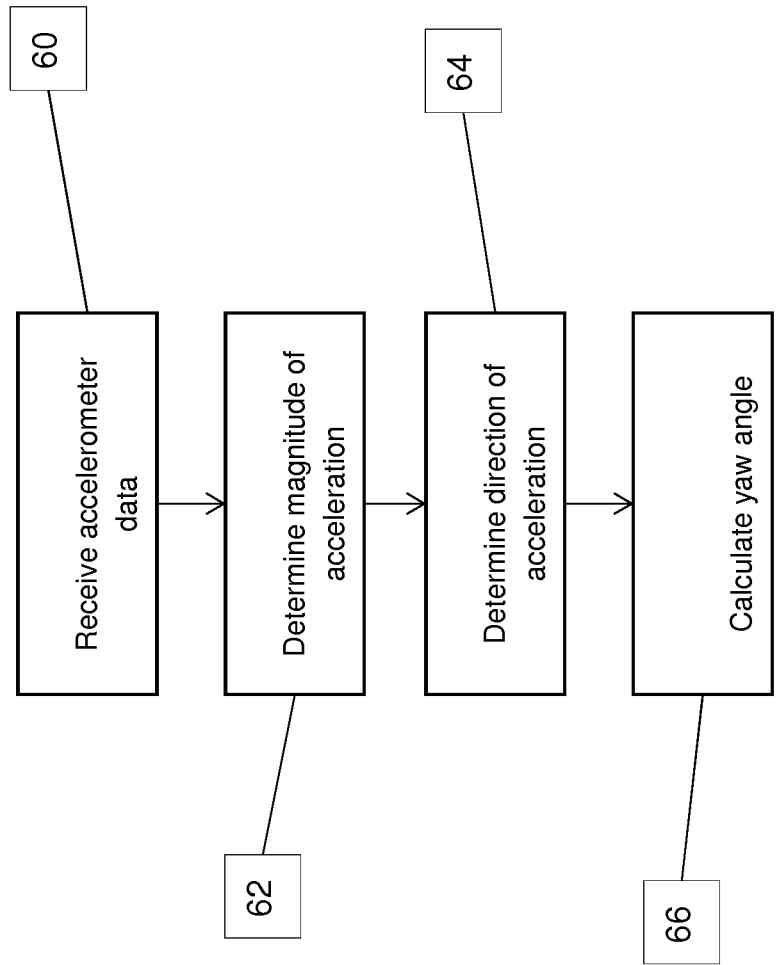
FIG. 6 is a flow chart of steps followed by the control unit of FIG. 1 to determine a yaw component.

FIG. 6 shows the steps completed by the control unit 11 when calculating the yaw angle error 50 of the removable reversing camera 16 when the vehicle 10 is accelerating in a straight line. The first step 60 involves the control unit 11 receiving accelerometer data from both the vehicle accelerometer 15 and the imaging accelerometer 24, along with data indicative of the velocity and acceleration of the tow vehicle 12. Next, the control unit 11 determines the magnitude of the acceleration of the vehicle 10 as part of step 62. The control unit 11 also determines the direction of acceleration based on the vehicle accelerometer data from the vehicle accelerometer 15 as the third step 64.

When the acceleration of the vehicle 10 is not equal to zero and the vehicle 10 is accelerating in a straight line the control unit 11 determines the yaw angle error 50 as the fourth step 66. The control unit 11 does this by comparing the acceleration vectors of both the tow vehicle 12 and the removable reversing camera 16 and the difference in these values gives the yaw angle 50 of the removable reversing camera 16.

The yaw angle 50 of the removable reversing camera 16 may initially be determined when the vehicle 10 first accelerates from stationary. The yaw angle 50 may then be monitored throughout a journey to monitor the removable camera 16 for any changes in yaw angle 50.

In another example, the vehicle 10 may be fitted with a system such as Tow Assist®, with this system the hitch angle of the trailer 14 may be calculated by the control unit 11. An example of the Tow Assist® system may be found in the GB patent, GB2534039B In this example the yaw angle 50 of the removable reversing camera 16 may be calculated when the vehicle 10 is accelerating but not in a straight line as the hitch angle of the trailer 14 is known. The hitch angle of the trailer 14 is input to the control unit 11 and the control unit 11 calculates the path and acceleration of the reversing camera 16 on the trailer 14. The control unit 11 subtracts this from the reported acceleration of the tow vehicle 12 to deduce the yaw angle error. This ensures that the yaw angle 50 calculated by the processor is the yaw angle 50 of the removable reversing camera 16 relative to the rear of the trailer 14 and not the yaw angle with reference to the rear of the tow vehicle 12.

The yaw angle 50 of the removable reversing camera 16 can also be calculated by determining the double integral of the acceleration vector of the imaging device or removable reversing camera 16 with respect to time. The double integral of the acceleration vector of the removable reversing camera 16 with respect to time gives the path followed by the removable reversing camera 16. The path of the tow vehicle 12 is known either from steering angle data supplied from a sensor associated with the steering wheel or from the double integral of the vehicle accelerometer data, with respect to time, from the tow vehicle accelerometer 15. The control unit 11 may compare the perceived paths of the tow vehicle 12 and the trailer 14 to determine the yaw angle 50 of the removable reversing camera 16.

For example, if we consider the case of the vehicle 10 accelerating in a straight line, both the direction of acceleration of the vehicle 10 and integrated path (i.e. displacement) of the removable reversing camera 16 should be at 0 degrees with respect to each other, about the z-axis, if the removable reversing camera 16 is fitted correctly. However, if the removable reversing camera 16 appears to be following a path at 10 degrees relative to the tow vehicle 12 when the vehicle 10 is accelerating in a straight line then the yaw angle of the removable reversing camera 16 is −10 degrees. Similarly, if the vehicle 10 travels along a random series of curves, starting at an origin, and ends up at a location 10 degrees from the origin and the vehicle accelerometer data for the imaging accelerometer 24 suggests a location at 20 degrees from the origin, a yaw error of 10 degrees can be inferred.

The constants generated in the double integration may be determined by considering data from the tow vehicle 12 as boundary conditions. When the vehicle 10 is travelling in a straight line the absolute yaw angles 50 should be equal which allows the constants of integration to be calculated.

The control unit 11 determines the declination 20, tilt 30 and yaw 50 angles of the removable reversing camera 16 relative to the reference orientation, for example the rear surface of the trailer 14, in dependence on received imaging accelerometer data and combines these values to calculate the orientation, and thus the alignment artefact of the removable reversing camera 16. The alignment artefact or alignment error is continuously monitored by the control unit 11 and is used to correct alignment artefacts within the image data generated by the imaging device or removable reversing camera 16.

The control unit 11 is configured to output images formed from and/or representative of the image data generated by the imaging device to the display device 13 within the tow vehicle 12. The output images comprise image data from some or all the imaging devices 16, 18a, 18b, 18c on the vehicle 10. A single, component image may be output on the display device 13 within the tow vehicle 12 showing the driver, a single image, of objects in the vicinity of the vehicle 10. The control unit 11 crops the image data, prior to outputting the image to the display device 13, from each imaging device to ensure a smooth transition between the component images from each imaging device on the display device 13.

Advantageously, by use of the error signal generated by the controller 11, even if the imaging device 16 is mounted out of alignment relative to the vehicle, the image displayed to the user of the vehicle 10 may be correctly aligned when presented on the display device 13.

Figure 7:
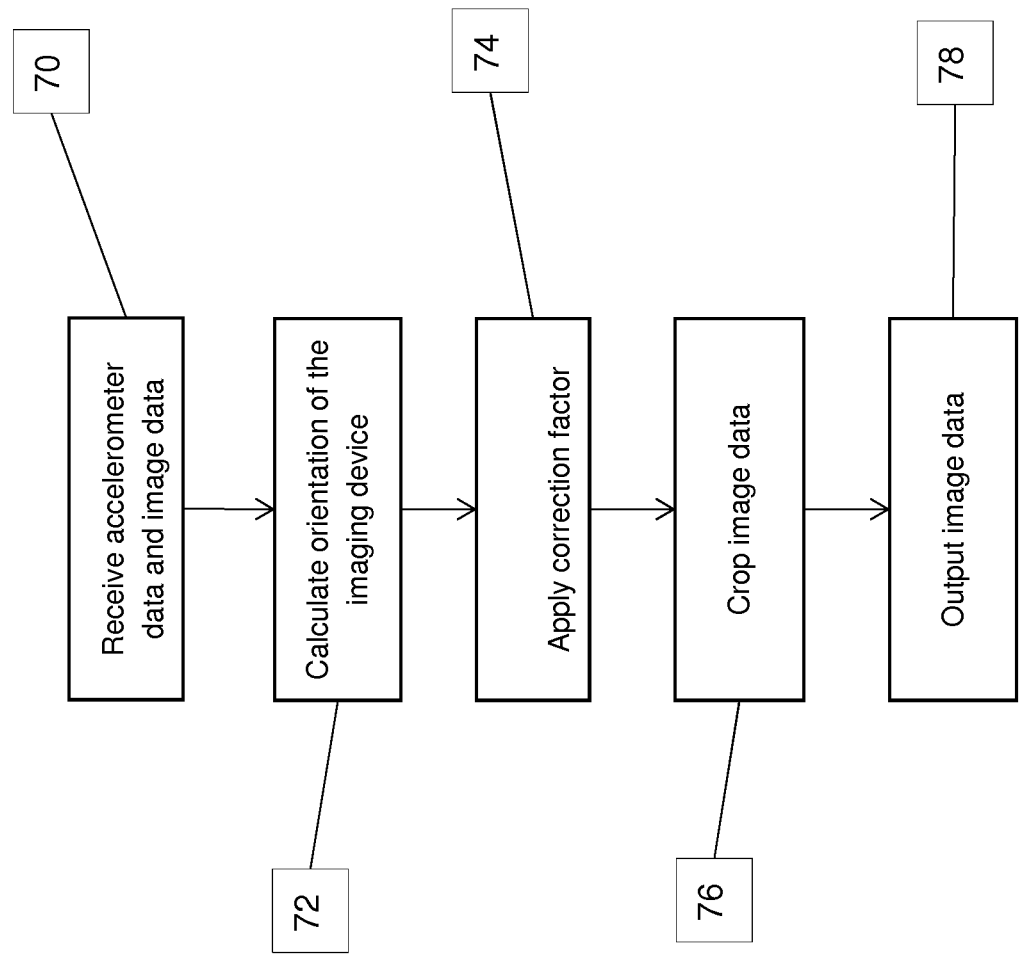
FIG. 7 is a flow chart of steps followed by the control unit of FIG. 1 when determining an alignment artefact and outputting corrected image data.

The process of outputting image data to the display device 13 within the tow vehicle 12, from the control unit 11 is shown in FIG. 7. The first step 70 involves the control unit 11 receiving image data from the imaging device or removable reversing camera 16 and fixed 18a, 18b, 18c reversing cameras along with imaging accelerometer data and vehicle accelerometer data from the imaging accelerometer 24 and the vehicle accelerometer 15 respectively. The imaging accelerometer data from the imaging accelerometer 24 may be transmitted wirelessly or through a wired connection to the control unit 11. Further articulated vehicle data may be input to the control unit 11 at this stage, such as the hitch angle of the trailer 14 or steering angle and direction of travel of the tow vehicle 12.

In the second stage 72, the processor within the control unit 11 calculates the orientation of the imaging device 16 based on the accelerometer data from the imaging accelerometer 24. The orientation of the imaging device or removable reversing camera 16 calculated at this stage is relative to the reference orientation (i.e. the horizontal or vertical). In another embodiment of the invention, the imaging device or removable reversing camera 16 may have sufficient computational capability to calculate the orientation of the imaging device prior to transmitting the imaging accelerometer data to the control unit 11.

The third stage 74 involves the control unit 11 calculating and applying correction factors based on the calculated orientation of the imaging device or removable reversing camera 16 relative to the reference orientation. A correction factor may be applied in scenarios where the vehicle is travelling upon an inclined surface and thus the orientation of the imaging device 16 relative to the vehicle 10 may have been calculated incorrectly, since the orientation of the vehicle 10 is different to the reference orientation. A first correction factor is calculated based on vehicle accelerometer data from the vehicle accelerometer 15. When the tow vehicle 12 is not accelerating, the vehicle accelerometer data from the vehicle accelerometer 15 provides data regarding the incline that the vehicle 10 is travelling upon. This data is referred to as a first correction factor. The control unit 11 applies the first correction factor to image data generated by the imaging device 16 in dependence on the received imaging accelerometer data to correct for the declination 20 and tilt 30 errors in the image data generated by the imaging device 16.

When the tow vehicle 12 is accelerating, the vehicle accelerometer 15 data is compared to the imaging accelerometer 24 data by the controller 11, to calculate the yaw angle 50 of the imaging device or removable reversing camera 16 relative to the trailer 14. When the trailer 14 is not accelerating in a straight line, as may be readily determined if the hitch angle 50 of the trailer 14 is known, then the hitch angle may be applied as a second correction factor. The control unit 11 applies the second correction factor to image data generated by the imaging device 16 based on the yaw angle 50 orientation of the imaging device 16 relative to the reference orientation to account for the optical alignment error of the removable reversing camera 16 relative to the trailer 11.

Using the calculated alignment artefact of the imaging device 16, the fourth step 76 involves cropping the generated image data output from the imaging device. The imaging device or removable reversing camera 16 may have a wide field of view (wider than the image to be cropped), meaning much of the image data captured by the imaging device may be disregarded. This ensures that even when the alignment artefact is relatively large, the imaging device 16 generates image data suitable for outputting to the vehicle display device 13.

The control unit 11 crops the image data so as to blend the image data from the removable reversing camera 16 with the image data from the fixed reversing cameras 18a, 18b, 18c to create a composite image. The final step 78 involves outputting the cropped image data to the display device 13 within the tow vehicle 12. The reversing cameras 16, 18a, 18b, 18c capture a wide field of view, much of which is cropped by the control unit 11.

The alignment of the removable reversing camera 16 is determined initially upon start-up of the vehicle 10 and is then monitored continuously throughout a journey.

In embodiments of the invention, a six degrees of freedom accelerometer may be mounted to the trailer 14 and used to provide data indicative of the trailer's acceleration and its orientation or rotational movement relative to the tow vehicle 12. The control unit 11 may monitor the rotation of the removable reversing camera 16 around the z-axis. Integrating the rotation about the vertical axis (z-axis) with respect to time gives the yaw angle 50 of the removable reversing camera 16.

The yaw angle 50 of the removable reversing camera 16 may also be determined when the vehicle 10 is cornering. The controller may receive an input indicative of the rotational acceleration of the removable reversing camera 16. Integrating the rotational acceleration twice allows the controller to determine the rotational displacement of the removable reversing camera 16 which may be used to infer the yaw angle 50 of the removable reversing camera 16. The controller 11 may further be arranged to receive a data signal indicative of a steering input applied by the user via a steering wheel or other such means provided to steer the vehicle. The constants of integration may be determined when the vehicle 10 is turning if the steering wheel angle of the tow vehicle 12 is input to the control unit 11 and used as boundary conditions.

Furthermore, the hitch angle of the trailer may be determined by determining the yaw angle 50 of the removable reversing camera 16 relative to the tow vehicle 12 during cornering and subtracting the known yaw angle 50 error of the removable reversing camera 16 relative to the trailer 14. The resulting yaw angle 50 is equal to the hitch angle.

Calculating the hitch angle in this manner, using a six degrees of freedom accelerometer, provides the advantage of not requiring an optical target to be fitted to the trailer 14 nor does it require a reversing camera to be fitted to the rear of the tow vehicle 12. Fitting a six degrees of freedom accelerometer to the removable reversing camera 16 allows the camera to be used on articulated vehicles 10 with no fixed reversing cameras 18a, 18b, 18c.

Figure 8:
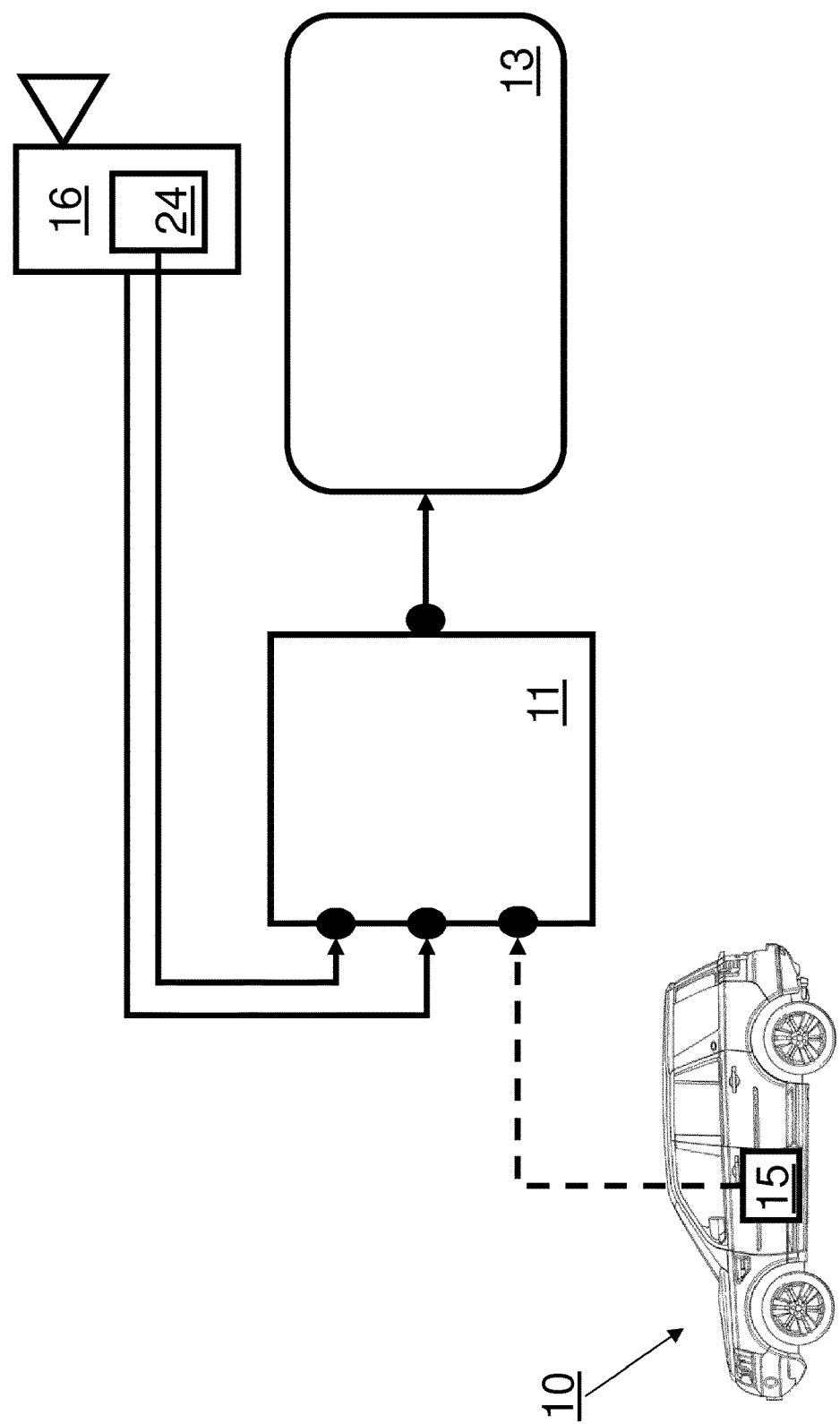
FIG. 8 shows a vehicle and controller according to aspects of the invention.

FIG. 8 shows a schematic view of a controller 11 in communication with a removable reversing camera 16 and a display device 13. In the example shown in the Figure, imaging data is received at the controller from the camera 16 along with imaging accelerometer data from the imaging accelerometer 24. In the Figure, the controller is further provided with an optional data feed from a vehicle accelerometer 15. In this arrangement, the controller 11 is arranged to compare vehicle accelerometer data from the vehicle accelerometer 15 with the imaging accelerometer data from the imaging accelerometer 24 and apply an error signal to the imaging data so as to output a corrected image on the display device 13. It will be appreciated that the vehicle accelerometer 15 may be integral with the controller 11 where the controller 11 is arranged to be installed into the vehicle 10, or may be an accelerometer installed in the vehicle primarily intended for other vehicle functions, but whose accelerometer data output is broadcast on a vehicle based communications bus, such as CANbus, accessible by the controller 11 in use. Other vehicle based data communication busses and protocols are useful.

FIG. 9 shows three examples of vehicles according to aspects of the invention. FIG. 9a shows a vehicle 10 in the form of an SUV, comprising a display 13 in communication with a removable reversing camera 16 via a controller 11 as has been described above. FIG. 9b shows the vehicle 10 comprising the SUV of FIG. 9a towing a trailer 14. In this example, the SUV is known as the tow car 12 and the combination of the tow car 12 and trailer 14 is referred to as the vehicle 10. The tow car 12 and the trailer 14 are connected by a selectively releasable articulated joint or hitch. In this example, the removable reversing camera 16 has been moved from a rear window of the SUV (FIG. 9a) onto a rearward facing surface of the trailer 14. Finally in FIG. 9c, the vehicle comprises an articulated vehicle 10 which, unlike the vehicle 10 of FIG. 9b, is not readily separable, but rather is considered a unitary vehicle with an engine and driver's cab connected by a non-releasable articulated joint to a dual-axle trailer. In both the examples of vehicle 10 of FIGS. 9b and 9c, it will be apparent that the driver may benefit from a rearward view behind the vehicle provided by the removable reversing camera 16. In the example shown in FIG. 9a, the improved rearward view provided to the driver by the removable reversing camera will be particularly useful when the rear of the vehicle is heavily loaded with luggage that would otherwise obscure rearward view via a rear window of the vehicle.

In general terms embodiments of the invention relate to a control module 112 for an articulated vehicle 110. The vehicle 110 comprises a tow vehicle 111 and a trailer 114, and the control module 112 is configured to determine the length of the trailer 114 being towed by the tow vehicle 111. The trailer 114 includes a trailer accelerometer 116 mounted to a rear surface 117 of the trailer 114 such that when the vehicle 111 moves the trailer accelerometer 116 generates trailer accelerometer data. Similarly, the tow vehicle 111 has a tow vehicle accelerometer 115 configured to generate tow vehicle accelerometer data. The trailer accelerometer may form part of an imaging device, such as a removable reversing camera. The trailer accelerometer data and tow vehicle accelerometer data are input to the control module 112 and the control module 112 determines the length of the trailer 114 in dependence on the received trailer and tow vehicle accelerometer data. The length of the trailer 114 may be output to a vehicle system such as an advanced driver assistance system such Tow Assist® and/or a visual indication as to the relative position of the tow vehicle 111 and the trailer 114 may be presented on a display device to aid the driver manoeuvre the articulated vehicle 110

Figure 10:
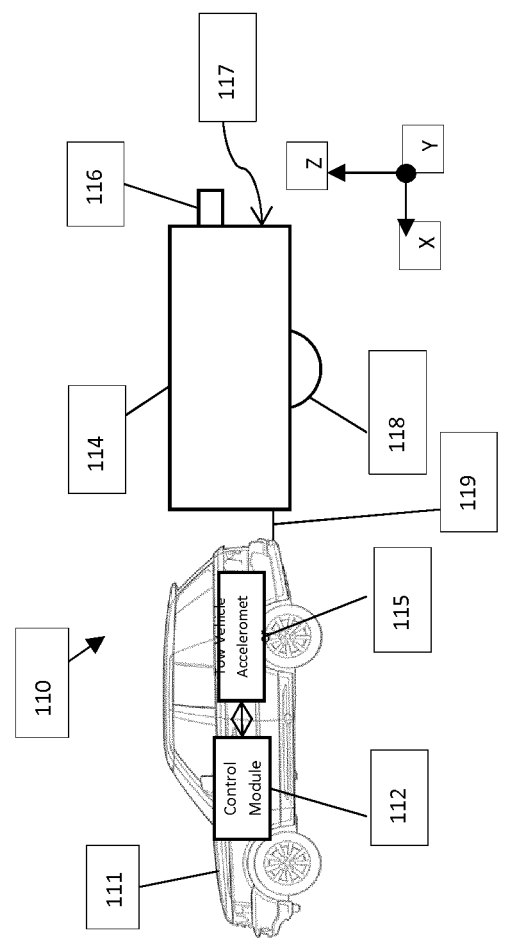
FIG. 10 shows a side view of an articulated vehicle comprising a tow vehicle and a trailer suitable for use with embodiments of the invention.
Figure 11:
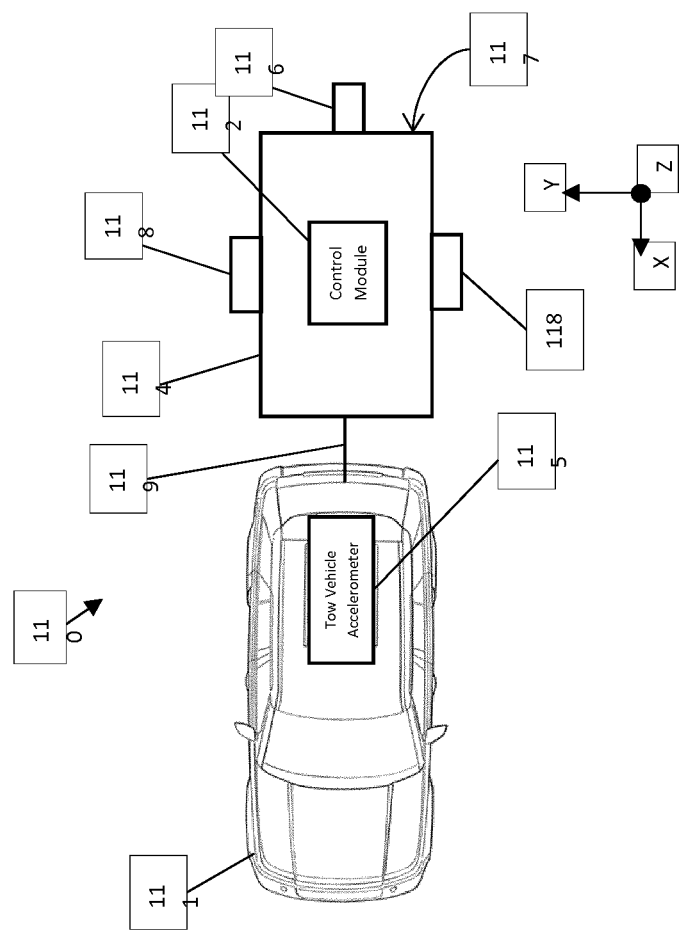
FIG. 11 shows a plan view of the articulated vehicle of FIG. 10.

To place embodiments of the invention in a suitable context, reference will firstly be made to FIGS. 10 and 11 which illustrate schematically a tow vehicle 111 and a trailer 114 arrangement, known, and referred to herein, as an "articulated vehicle" 110, suitable for use with embodiments of the invention. The tow vehicle 111 may be, for example, a car, SUV, MPV, truck or tractor and the trailer 114 may be, for example, a caravan, horse box, boat trailer, semi-trailer or any other trailer suitable for being towed by a tow vehicle 111.

The trailer 114, attached to the tow vehicle 111 by means of an articulated hitch 119, is fitted with an accelerometer 116, herein referred to as a "trailer accelerometer", configured to generate and transmit trailer accelerometer data to the control module 112. The trailer accelerometer data generated by the trailer accelerometer 116 is typically indicative of a lateral or vertical displacement of the trailer 114 relative to the tow vehicle 111. The trailer accelerometer 116 may be an independent device or may form part of an imaging device such as a removable reversing camera, a RADAR module or a LIDAR module associated with the trailer 116. The control module 112 may be located in the tow vehicle 111, the trailer 114, or the removable reversing camera comprising the imaging means.

The trailer 114 shown in FIG. 10 has an axle arrangement 118 comprising an axle and two wheels located at opposing ends of the axle to support the trailer 114. In the example shown, the axle arrangement 118 is positioned substantially in the centre of the trailer 114 which is typical of many trailers towed by non-commercial tow vehicles such as caravans, boat trailers, or horseboxes. The position of the axle arrangement 118 is referred to as the "overhang ratio" which is defined as the distance between the articulated hitch 119 and the axle arrangement 118 divided by the distance between the rear surface of the trailer 117 and the axle arrangement 118. In the example shown, the overhang ratio is substantially equal to 1 as the axle arrangement 118 is located centrally.

The tow vehicle 111 comprises an accelerometer 115, herein referred to as a "vehicle accelerometer", configured to generate vehicle accelerometer data and transmit said vehicle accelerometer data to the control module 112. The vehicle accelerometer data is typically indicative of a lateral and/or vertical displacement of the tow vehicle 111.

The articulated vehicle 110 comprises a control module 112 which may form part of the tow vehicle 111 (as shown in FIG. 10) or the trailer 114 (as shown in FIG. 11). In the example shown in FIGS. 10 and 11, the tow vehicle 111 is fitted with a tow vehicle accelerometer 115. The tow vehicle accelerometer 115 is configured to provide an input signal to the control module 112 comprising tow vehicle accelerometer data indicative of the displacement of the tow vehicle 111.

FIG. 10 also shows a set of Cartesian axes local to the vehicle 110 and comprising a longitudinal forward axis x, a lateral axis y and a vertical axis z. The axes are arranged so that forward vehicle travel in a forward gear is generally in the +x direction, and generally perpendicular to the y-axis. The +z direction is upwards, away from the ground over which the vehicle 110 is travelling. This labelling convention, local to the articulated vehicle 110, is used throughout.

Figure 12:
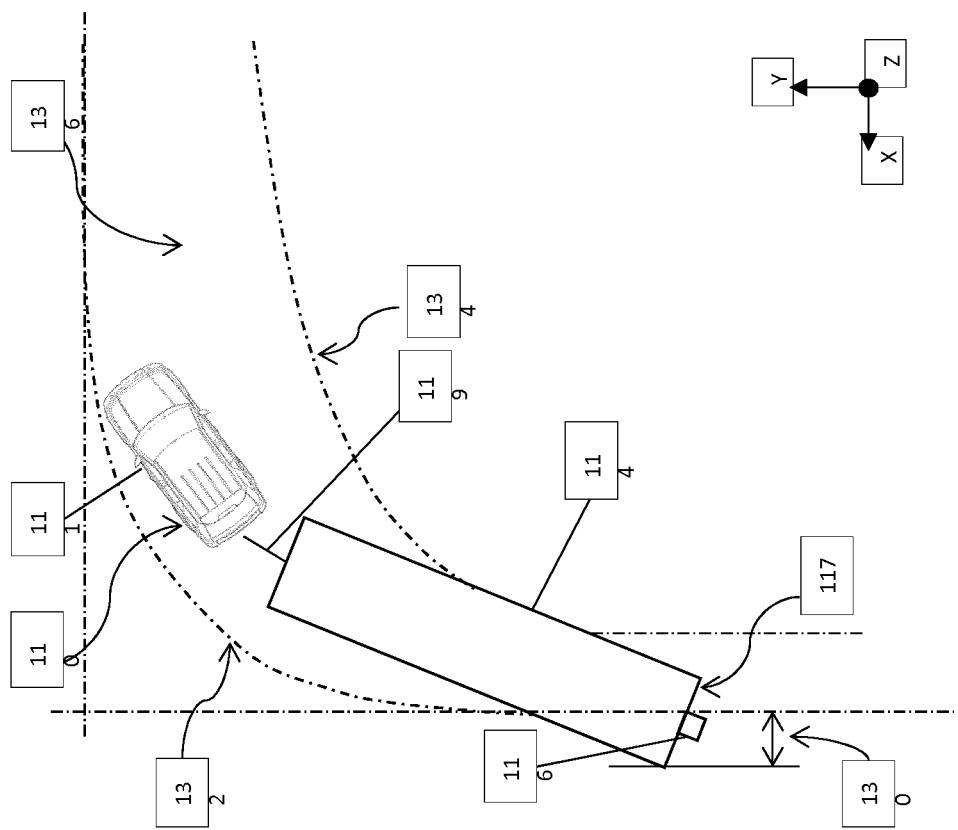
FIG. 12 shows a plan view of the articulated vehicle of FIG. 10 travelling around a corner.

FIG. 12 illustrates schematically the articulated vehicle 110 travelling around a 90° right hand corner. When the articulated vehicle 110 travels around a corner, the rear of the trailer 114 swings outward relative to the tow vehicle 111 when the articulated vehicle 110 initiates the turn before returning to follow the tow vehicle 111 once a constant radius of cornering is achieved. The tow vehicle 111 follows a tow vehicle path 132 which is defined as the outmost radius of curvature that the tow vehicle 111 follows when making the turn illustrated in FIG. 12. The radius of the tow vehicle path 132 is determined by the control module 112 by monitoring, for example, the steering wheel angle of the tow vehicle 111 as the tow vehicle 111 travels around the corner or from the tow vehicle accelerometer data being generated by the tow vehicle accelerometer 115.

FIG. 12 also illustrates a trailer path 134 which is defined as the innermost radius of curvature that the trailer 114 follows when making a turn. The region 136 bound by the vehicle path 132 and the trailer path 134 defines a region 136, known as the "swept region" that is swept by the articulated vehicle 110 as the articulated vehicle 110 turns the corner. The distance between the vehicle path 132 and the trailer path 134 is referred to as "off-tracking" or corner-cutting.

As mentioned previously, the rear of the trailer 114 swings outward away from the tow vehicle path 132 when the articulated vehicle 110 travels around a corner. The lateral displacement of the rear surface 117 of the trailer 114 relative to the tow vehicle path 132 when the articulated vehicle 110 is cornering is defined as the outswing 130. The magnitude of the outswing 130 is proportional to the length of the trailer 114. Thus, if the trailer outswing 130 is known then the length of the trailer 114 may be calculated. The length of the trailer 114 calculated by the control module 112 is approximately equal to the distance between the articulated hitch 119 and the trailer accelerometer 116 (positioned on the rear surface 117 of the trailer 114). The outswing 130 of the rear surface 117 of the trailer 114 may be captured by the trailer accelerometer data being generated and input to the control module 112 by the trailer accelerometer 116 associated with the rear surface 117 of the trailer 114. In the example shown in FIG. 12, the trailer accelerometer data is indicative of a lateral displacement of the rear surface 117 of the trailer 116 relative to the tow vehicle 111.

The magnitude of the outswing 130 of the trailer 114 is proportional to the length of the trailer 114 and the radius of the turn or vehicle path 132. Thus, the length of the trailer 114 may be calculated by the control module 112 based on the magnitude of outswing of the trailer 114 as the articulated vehicle 110 travels around a corner. The control module 112 may use known parameters of the tow vehicle 111, such as the wheelbase of the tow vehicle 111 and the turn radius of the tow vehicle 111, when calculating the length of the trailer 114.

The tow vehicle 111 may be fitted with a video display device mounted within the vehicle cabin such that, in use, it is visible to the driver of the tow vehicle 111. The video display device may be configured as to display a plan view of the articulated vehicle 110 and any objects located within its surroundings in real time. Furthermore a predicted trajectory of both the tow vehicle 111 and the trailer 114 may be displayed on the video display device based on vehicle parameters such as vehicle speed and steering wheel angle. This is advantageous as the video display device may illustrate the predicted trajectory of the articulated vehicle 110, including the predicted outswing of the trailer 114, thereby providing the driver of the articulated vehicle 110 with guidance when manoeuvring so that the driver can take action to avoid unwanted outswing or off-tracking of the trailer 114. Furthermore, the video display device may predict and display a preferred route around a corner to a driver where the preferred route is a route around a corner that minimises unwanted outswing or off-tracking thereby reducing the chance of the driver making a mistake when driving around a corner.

In an embodiment, the control module 112 assumes that the overhang ratio of the trailer 114 is substantially equal to 1 when calculating the length of the trailer 114. This is a fair assumption for the majority of trailers that are commonly towed by non-commercial tow vehicles, such as caravans or horse boxes. However, it is envisaged that a user of the vehicle 110 may override this assumption by manually inputting an overhang ratio appropriate for the trailer 114 being towed by the tow vehicle 111. For example, the user of the vehicle may manually input an appropriate value for the overhang ratio or the user may select the type of trailer 114 being towed from a predefined list. The predefined list has a list of trailer types that may be towed by the tow vehicle 111 with each option having an associated overhang ratio typical of said trailer type. The predefined list may include further trailer characteristics which are discussed in further detail below.

Figure 13:
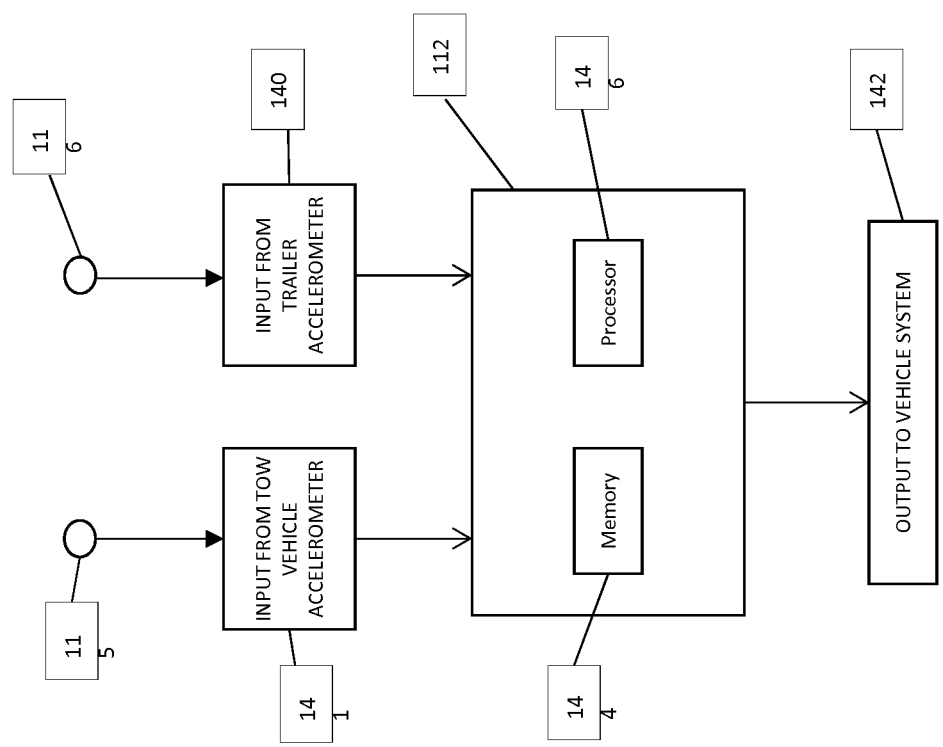
FIG. 13 schematically shows a control module suitable for use with embodiments of the invention.

FIG. 13 illustrates schematically an example of the control module 112, suitable for use with embodiments of the invention. The control module 112 comprises a first input 10 configured to receive an input signal indicative of trailer accelerometer data being generated by the trailer accelerometer 116 and a second input 141 configured to receive an input signal indicative of tow vehicle accelerometer data being generated by the tow vehicle accelerometer 115. Furthermore, the control module 112 comprises a memory module 144 configured to store data and a processor module 146 configured to determine the length of the trailer 114 in dependence on data received at the input 140 of the control module 112.

The control module 112 also comprises an output 412 configured to provide an output signal to a vehicle system indicative of the length of the trailer 114. The output signal may be output to another control module forming part of the articulated vehicle 110 or it may be output to a vehicle system such as one or more of the following: a human-machine interface (HMI) within the vehicle cabin, a driver guidance system having a display to provide information to the driver such as an indication of the ideal driving line to avoid unwanted outswing or corner cutting of the trailer, an ADAS feature, a towing system to provide assistance to a user of the vehicle 111 when towing a trailer 114, a parking system to provide assistance to a user of the vehicle 110 when parking, a blind spot system to provide guidance to a user of the vehicle when an object is positioned within the vehicle's blind spot, or a lane guidance system. The skilled person would appreciate that there may be other vehicle systems, such as other ADAS features, that may benefit from receiving data indicative of the length of the trailer 114 being towed by the tow vehicle 111.

Figure 14A:
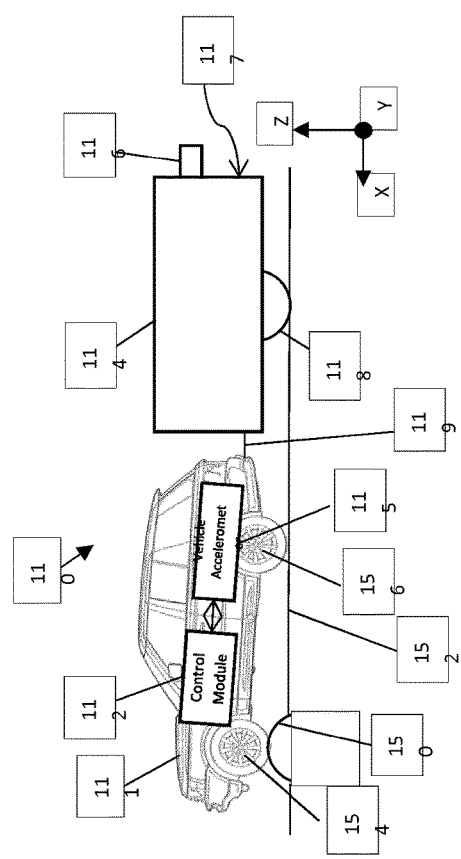
FIGS. 14a, 14b and 14c show a side view of the articulated vehicle of FIG. 10 travelling over a feature on the road.
Figure 14B:
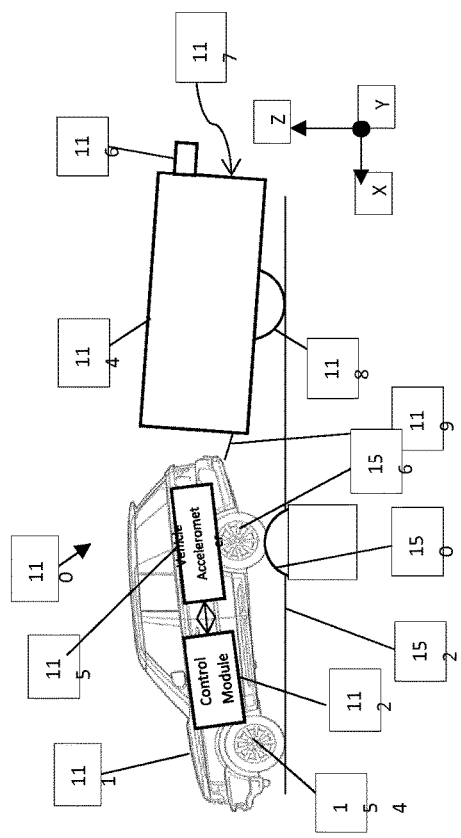
Figure 14C:
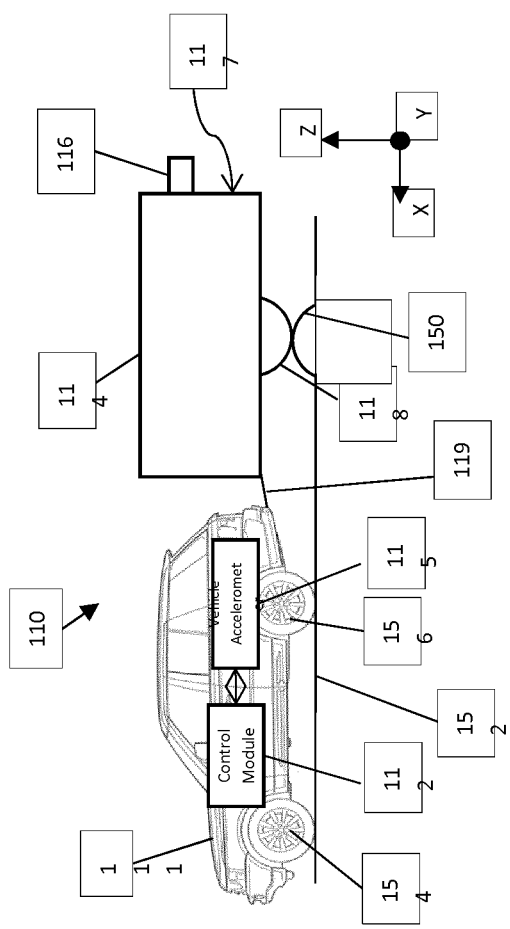

FIGS. 14a, 14b and 14c show the articulated vehicle 110 travelling over a feature 150 such as a speed bump positioned on a road 152 upon which the articulated vehicle 110 is travelling. In this situation the tow vehicle 111 and trailer 114 are both subject to a vertical displacement substantially equivalent to the magnitude of the feature 150. The vertical displacement of the tow vehicle 111 and the trailer 114 is captured by the vehicle accelerometer data and the trailer accelerometer data respectively before being input to the control module 112. FIGS. 14a and 14b illustrate schematically the front axle 154 and rear axle 156 of the tow vehicle 111 negotiating the feature 150 on the road 152 respectively. FIG. 14c shows the axle arrangement 118 of the trailer 114 negotiating the feature 150 on the road 152.

The acceleration data captured by the vehicle accelerometer 115 pertaining to the tow vehicle's progress over the feature 150 may be usefully corroborated by capturing the transient change in vertical acceleration twice. The first change in vertical acceleration captured by the vehicle accelerometer 115 occurs when the front axle 154 of the tow vehicle 111 negotiates the feature 150 as shown in FIG. 14a and the second change in vertical acceleration is captured by the vehicle accelerometer 115 when the second axle 156 negotiates the feature 150 as shown in FIG. 14b. A third change in vertical displacement is captured by the trailer accelerometer 116 when the axle arrangement 118 of the trailer 114 travels over the feature 150 as shown in FIG. 14c.

The acceleration data captured by the vehicle accelerometer 115 and the trailer accelerometer 116 is input to the control module 112. The time between each of the first, second and third vertical displacements is also captured and monitored by the control module 112.

The speed of the tow vehicle 111 is known from vehicle speed sensors and the distance between the front and rear axle 154, 156 of the tow vehicle 111 is also known. The control module 112 compares the elapsed time between the front axle 154 negotiating the feature 150 and the rear axle 156 negotiating the feature 150 with the speed of the tow vehicle 111 thereby verifying both the fact that the first and second vertical displacements are a result of the same feature 150 and that the speed of the vehicle 110 is correct.

The control module 112 then compares the elapsed time between the second vertical displacement, resulting from the rear axle 156 negotiating the feature 150, and the third vertical displacement resulting from the axle arrangement 118 of the trailer 114 negotiating the feature 150 with the speed of the articulated vehicle 110. Thus, the distance between the rear axle 156 and the axle arrangement 118 of the trailer 114 may be calculated. In examples where the axle arrangement 118 of the trailer is positioned substantially in the centre of the trailer 114 (i.e. the overhang ratio equals 1) the distance between the rear axle 156 and the axle arrangement 118 may be doubled to give an approximation of the total length of the trailer 114. In examples where the axle arrangement 118 of the trailer 114 is not in the centre of the trailer 114 then the user may input the location of the axle arrangement, including the number of axles on the trailer 114 and the control module 112 may adjust the calculation of the total trailer length accordingly.

Figure 15A:
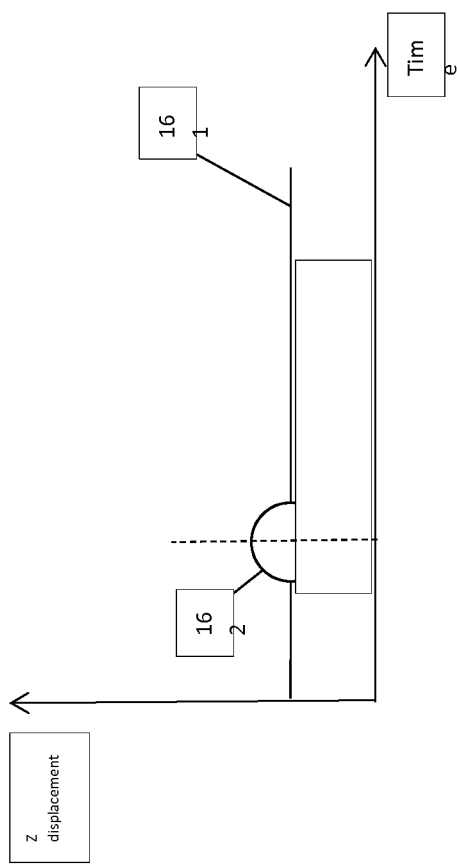
Figure 15B:
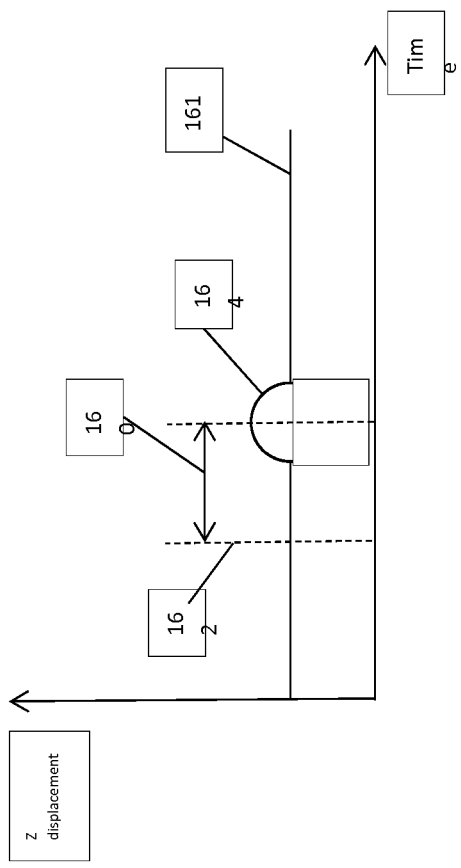

Turning now to FIGS. 15a, 15b and 15c which shows an example of the tow vehicle accelerometer data 161 and the trailer accelerometer data 163 input to the control module 112 when the articulated vehicle 110 travels along the road 152 is shown with respect to time in FIG. 15a, FIG. 15b and FIG. 15c respectively. The tow vehicle accelerometer data 161 and the trailer accelerometer data 163 both vary with time as the articulated vehicle 110 travels along a given section of road 152. The transient vertical acceleration or Z-disturbance fluctuation 162 in the tow vehicle accelerometer data 161 shown in FIG. 15a is a result of the front axle 154 of tow vehicle 111 travelling over the feature 150 on the road 152. In this example, the transient 162 is caused as the front axle 154 of the tow vehicle 111 negotiates the feature 150. Similarly, the transient vertical acceleration 164 illustrated in FIG. 15b is a result of the rear axle 156 of the tow vehicle 111 negotiating the feature 150. A transient vertical acceleration, or Z-disturbance 166 shown in FIG. 15c is a result of the trailer 114 travelling over the same feature 150 on the road 152 upon which the articulated vehicle 110 is travelling. The control module 112 can determine a phase difference 160, 167 or time, between each vertical acceleration fluctuation or disturbance 162, 164, 166 which, when compared with the speed that the articulated vehicle 110 is travelling at can be used to calculate the distance between the rear axle 156 of the tow vehicle 111 and the axle arrangement 118 of the trailer 114 thereby allowing the length of the trailer 114 to be calculated by the control module 112.

The control module 112 may calculate the length of the trailer 114 when the articulated vehicle 110 is travelling around a corner, as shown in FIG. 12, or when the articulated vehicle 110 travels over a feature 150 on the surface of the road 152 which causes the trailer 114 to displace vertically to the tow vehicle 111 as shown in FIGS. 15a, 15b and 15c. It is advantageous to calculate a value for the length of the trailer 114 when the vehicle 110 travels around a corner and when the vehicle 110 travels over a feature 150 on the road 152. The values calculated for the length of the trailer 114 in each of the aforementioned scenarios are stored in the memory module 144. The control module 112 may then determine the average trailer 114 length based on the trailer lengths stored in the memory module 144 to improve the accuracy of the calculated trailer 114 length. The control module 112 may calculate and store multiple values for the length of the trailer 114 so that an average trailer length may be calculated. The more values the control module 112 calculates the more accurate the estimate of the trailer length is likely to be.

The control module 112 is configured to calculate the length of the trailer 14 at the start of a drive cycle such that the length of the trailer 114 may be input into vehicle systems that require the length of the trailer to calibrate. When the control module 112 calculates the length of the trailer 114 the length of the trailer 114 is stored in the memory module 144 of the control module 112. Each trailer 114 being towed by the tow vehicle 111 has an associated unique identifier, such that the length of the trailer 114 and the associated unique identifier may be stored together in the memory module 144. This is advantageous as once the control module 112 calculates the length of the trailer 114 the data is stored in the memory module 144 and may be retrieved by the control module 112 in subsequent drive cycles thereby mitigating against the need to calculate the length of the trailer 114 being towed by the tow vehicle 111 at the start of every drive cycle prior to calibrating vehicle systems or ADAS features.

The control module 112 may be configured to continue to calculate the length of the trailer 114 periodically throughout the duration of a drive cycle to improve the accuracy of the length of the trailer 114 as determined by the control module 112. For example, the control module 112 may calculate the length of the trailer 114 at predetermined discrete time intervals and store the results in the memory module 144 of the control module 112. The control module 112 may then calculate an average trailer length based on the calculated trailer lengths which the control module 112 may output to a vehicle system. The average trailer length, and associated trailer identifier, can then be stored in the memory module 144 within the control module 112.

As previously mentioned, the control module 112 may include a predefined list of trailers, including trailer characteristics associated with each trailer type. The predefined list is typically displayed to the user of the vehicle by way of a display or HMI located within the vehicle cabin. For example, if the user selects "horsebox" from the predefined list then the control module 112 selects the trailer characteristics that are typical for a "horsebox". The trailer characteristics may include an overhang ratio typically associated with each trailer type. The overhang ratio alters the magnitude of outswing 130 experienced by a trailer 114 when cornering and thus it is advantageous to accurately estimate the overhang ratio for the trailer 114 prior to calculating the length of the trailer 14 via the outswing 130. As mentioned previously, the overhang ratio for many non-commercial caravans and horseboxes is 11, however, some large trailers, such as fifth wheel campers and some commercial trailers or semi-trailers the overhang ratio may vary greatly.

The user of the articulated vehicle 110 may manually input further trailer characteristics to the control module 12 such as number of axles on the trailer 114 or length of the articulated hitch 119. This is advantageous as characteristics of trailers may vary thus providing the user of the vehicle with a means of inputting trailer characteristics may improve the accuracy of the value of the length of the trailer calculated by the control module 112.

Furthermore, the trailer characteristics may include data indicative of the door type associated with each trailer type. This is particularly advantageous when the length of trailer 114 is being input to a parking assistance system. The length of the door on the rear surface 117 of the trailer 114 may be added to the calculated length of the trailer 114 to give an approximation of the length of parking space required for the entire articulated vehicle 110. For example, if the user selects the trailer type as "horsebox", where the door is typically located on the rear surface 117 of the trailer 114 then the articulated vehicle 110 would require a larger parking space than if the user had selected an alternative trailer type, such as "caravan", where the door of the vehicle is located on a side surface of the trailer 114.

Figure 16:
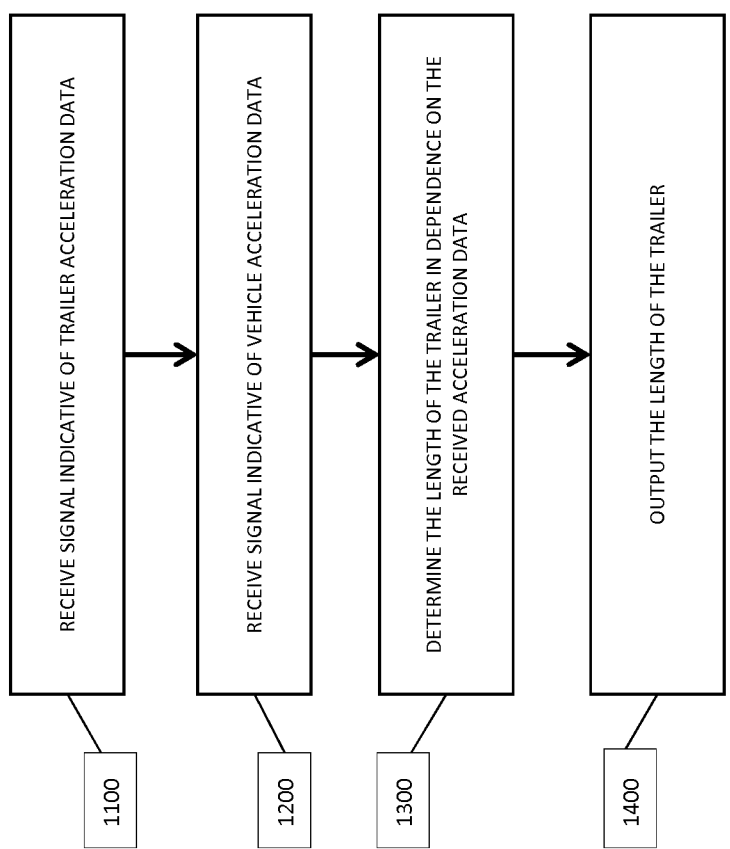
FIG. 16 shows a flow chart of steps followed by the control module of FIG. 13 when determining the length of the trailer of FIG. 10.

FIG. 16 shows the steps followed by the control module 112 when determining the length of the trailer 114. The first step 1100 the control module 112 receives an input signal indicative of trailer accelerometer data being generated by the trailer accelerometer 116. The trailer accelerometer data may be indicative of a lateral and/or vertical displacement of the trailer 114 relative to the tow vehicle 111.

In the next step 1200, the control module 112 receives an input signal indicative of tow vehicle accelerometer data being generated by the tow vehicle accelerometer 115. In the next step 1300 the control module 114 determines the length of the trailer 114 in dependence on the received trailer accelerometer data. In the final step 1400, the control module 112 outputs the length of the trailer to a vehicle system.

Many modifications may be made to the above examples without departing from the scope of the present invention as defined in the accompanying claims.

The invention claimed is:

1. A controller for a vehicle, the vehicle comprising a vehicle accelerometer, and the vehicle also comprising an imaging device for generating image data, and the imaging device further comprising an imaging accelerometer for generating imaging accelerometer data for determining the orientation of the imaging device relative to the vehicle, the controller comprising:

an input for receiving a signal indicative of the imaging accelerometer data and the generated image data;

an input for receiving a signal indicative of the vehicle accelerometer data;

a processor arranged to calculate the magnitude of a yaw angle between the vehicle and the received image data in dependence on the difference between the imaging accelerometer data and the vehicle accelerometer data when the vehicle is accelerating; and an output for outputting corrected image data in dependence on the generated image data and the calculated yaw angle.

2. The controller as claimed in claim 1, wherein the controller is arranged to determine the orientation of the imaging device relative to the vehicle based on the imaging accelerometer data.

3. The controller as claimed in claim 1, wherein the vehicle is an articulated vehicle comprising a tow vehicle and a trailer.

4. The controller as claimed in claim 3, wherein the imaging device is mounted to the trailer.

5. The controller as claimed in claim 3, wherein the orientation of the imaging device is determined relative to the trailer.

6. The controller as claimed in claim 3, wherein the vehicle accelerometer is positioned on the tow vehicle.

7. The controller as claimed in claim 6, wherein the controller is arranged to determine the orientation of the tow vehicle relative to a reference orientation based on the vehicle accelerometer data from the vehicle accelerometer.

8. A vehicle comprising the controller of claim 1.

9. A trailer comprising the controller of claim 1.

10. A method of correcting alignment errors in image data from an imaging device for a vehicle, wherein the imaging device generates image data and comprises an imaging accelerometer for generating imaging accelerometer data, and the vehicle comprises a vehicle accelerometer, the method comprising:

receiving the imaging accelerometer data and image data;
receiving vehicle accelerometer data:
calculating the magnitude of the yaw angle between the vehicle and the received image data in dependence on the difference between the imaging accelerometer data and the vehicle accelerometer data when the vehicle is accelerating; and
outputting corrected image data in dependence on the image data and the calculated yaw angle.

11. The method as claimed in claim 10, further comprising determining the orientation of the imaging device relative to the vehicle based on the imaging accelerometer data.

12. The method as claimed in claim 10, wherein the vehicle is an articulated vehicle comprising a tow vehicle and a trailer.

13. The method as claimed in claim 12, wherein the imaging device is mounted to the trailer.

14. The method as claimed in claim 12, wherein the orientation of the imaging device is determined relative to the trailer.

15. The method as claimed in claim 12, wherein the vehicle accelerometer is positioned on the tow vehicle.

16. The method as claimed in claim 15, further comprising determining the orientation of the tow vehicle relative to a reference orientation based on the vehicle accelerometer data from the vehicle accelerometer.

\* \* \* \* \*